(12) United States Patent
Bruce et al.

(10) Patent No.: US 12,106,422 B2
(45) Date of Patent: Oct. 1, 2024

(54) GRAPHICS PROCESSING

(71) Applicant: Arm Limited, Cambridge (GB)

(72) Inventors: Richard Bruce, Cambridge (GB);
William Robert Stoye, Cambridge (GB); Mathieu Jean Joseph Robart, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/805,453

(22) Filed: Jun. 4, 2022

(65) Prior Publication Data
US 2022/0392147 A1 Dec. 8, 2022

(30) Foreign Application Priority Data

Jun. 4, 2021 (GB) ..................................... 2108050

(51) Int. Cl.
*G06T 15/06* (2011.01)
*G06F 16/901* (2019.01)
*G06T 15/00* (2011.01)

(52) U.S. Cl.
CPC .......... *G06T 15/06* (2013.01); *G06F 16/9027* (2019.01); *G06T 15/005* (2013.01); *G06T 2210/21* (2013.01)

(58) Field of Classification Search
None
See application file for complete search history.

(56) References Cited

U.S. PATENT DOCUMENTS

| 5,197,140 A | 3/1993 | Balmer |
| 5,475,856 A | 12/1995 | Kogge |
| 5,588,152 A | 12/1996 | Dapp et al. |
| 6,272,616 B1 | 8/2001 | Fernando et al. |

(Continued)

FOREIGN PATENT DOCUMENTS

| EP | 3675046 A1 | 1/2020 |
| JP | 2001148028 A | 5/2001 |

(Continued)

OTHER PUBLICATIONS

Restriction Requirement dated Aug. 3, 2023, U.S. Appl. No. 17/804,453.

(Continued)

*Primary Examiner* — Ryan M Gray
(74) *Attorney, Agent, or Firm* — Vierra Magen Marcus LLP

(57) ABSTRACT

An instruction (or set of instructions) that can be included in a program to perform a ray tracing acceleration data structure traversal, with individual execution threads in a group of execution threads executing the program performing a traversal operation for a respective ray in a corresponding group of rays such that the group of rays performing the traversal operation together. The instruction(s), when executed by the execution threads in respect of a node of the ray tracing acceleration data structure, cause one or more rays from the group of plural rays that are performing the traversal operation together to be tested for intersection with the one or more volumes associated with the node being tested. A result of the ray-volume intersection testing can then be returned for the traversal operation.

16 Claims, 14 Drawing Sheets

(56) References Cited

U.S. PATENT DOCUMENTS

| | | |
|---|---|---|
| 7,324,112 B1 | 1/2008 | Lindholm et al. |
| 7,353,369 B1 | 4/2008 | Coon et al. |
| 7,999,808 B1 | 8/2011 | Aila et al. |
| 8,072,454 B1 | 12/2011 | Aila et al. |
| 9,063,722 B2 | 6/2015 | Pechanek et al. |
| 9,311,102 B2 | 4/2016 | Shah et al. |
| 10,964,086 B2 | 3/2021 | Croxford et al. |
| 11,315,303 B2 | 4/2022 | Saeed et al. |
| 11,900,522 B2 | 2/2024 | Sideris et al. |
| 2004/0125103 A1* | 7/2004 | Kaufman ............... G06T 15/08 345/419 |
| 2008/0079713 A1* | 4/2008 | Mejdrich ............... G06T 15/06 345/418 |
| 2009/0167763 A1 | 7/2009 | Waechter et al. |
| 2009/0262132 A1* | 10/2009 | Peterson ............... G06T 15/80 345/619 |
| 2010/0033493 A1 | 2/2010 | Nutter et al. |
| 2011/0069067 A1 | 3/2011 | Ozdas et al. |
| 2011/0078690 A1 | 3/2011 | Fahs et al. |
| 2011/0102261 A1 | 5/2011 | Egri et al. |
| 2014/0168228 A1* | 6/2014 | Luebke ............... G06F 9/5066 345/505 |
| 2014/0168238 A1 | 6/2014 | Luebke et al. |
| 2015/0262408 A1* | 9/2015 | Lee ............... G06T 15/06 345/426 |
| 2016/0019066 A1 | 1/2016 | Diamos et al. |
| 2016/0093090 A1 | 3/2016 | Shin et al. |
| 2016/0350960 A1 | 12/2016 | Yi et al. |
| 2019/0057539 A1 | 2/2019 | Stanard et al. |
| 2021/0390758 A1 | 12/2021 | Muthler et al. |
| 2022/0392145 A1* | 12/2022 | Bruce ............... G06T 15/06 |
| 2022/0392147 A1* | 12/2022 | Bruce ............... G06T 15/06 |
| 2023/0062386 A1 | 3/2023 | Sideris et al. |

FOREIGN PATENT DOCUMENTS

| | | |
|---|---|---|
| WO | 2014068400 A2 | 5/2014 |
| WO | 2016060874 A1 | 4/2016 |

OTHER PUBLICATIONS

Response to Restriction Requirement dated Aug. 8, 2023, U.S. Appl. No. 17/804,453.
Combined Search and Examination Report under Sections 17 and 18(3) dated Nov. 10, 2021, GB Patent Application No. GB2108050.2.
Search Report under Section 17 dated Dec. 7, 2021, GB Patent Application No. GB2108052.8.
Combined Search and Examination Report under Sections 17 and 18(3) dated Dec. 9, 2021, GB Patent Application No. GB2108053.6.
Search Report under Section 17(6) dated Jun. 6, 2022, GB Patent Application No. GB2108053.6.
U.S. Appl. No. 17/804,453, filed May 27, 2022.
U.S. Appl. No. 17/805,387, filed Jun. 3, 2022.
Final Office Action dated Apr. 25, 2024, U.S. Appl. No. 17/804,453, 59 pages.
Notice of Allowance dated Apr. 11, 2024, U.S. Appl. No. 17/805,387, 31 pages.
Response to Non-Final Office Action dated Feb. 13, 2024, U.S. Appl. No. 17/805,387, 16 pages.
Response to Non-Final Office Action dated Mar. 1, 2024, U.S. Appl. No. 17/804,453, 28 pages.
Non-Final Office Action dated Jan. 4, 2024, U.S. Appl. No. 17/805,381, 19 pages.
Non-Final Office Action dated Nov. 1, 2023, U.S. Appl. No. 17/804,453, 48 pages.
Non-Final Office Action dated Nov. 14, 2023, U.S. Appl. No. 17/805,387, 38 pages.
Response to Final Office Action dated Aug. 22, 2024, U.S. Appl. No. 17/804,453, 23 pages.

* cited by examiner

|   | 31-28 | 27-24 | 23-20 | 19-16 | 15-12 | 11-8 | 7-5 | 3-0 |
|---|---|---|---|---|---|---|---|---|
| 0 | p_x ||||| | Reserved ||
| 1 | p_y ||||| | Reserved ||
| 2 | p_z ||||| | Reserved ||
| 3 | scale_x | | | | | | | |
| 4 | scale_y | | | | | | | |
| 5 | nt1 | | nt0 | | | | scale_z ||
| 6 | nt5 | | nt4 | | nt3 | | nt2 | |
| 7 | hi_x1 || lo_x1 || hi_x0 || lo_x0 ||
| 8 | hi_x3 || lo_x3 || hi_x2 || lo_x2 ||
| 9 | hi_x5 || lo_x5 || hi_x4 || lo_x4 ||
| 10 | hi_y1 || lo_y1 || hi_y0 || lo_y0 ||
| 11 | hi_y3 || lo_y3 || hi_y2 || lo_y2 ||
| 12 | hi_y5 || lo_y5 || hi_y4 || lo_y4 ||
| 13 | hi_z1 || lo_z1 || hi_z0 || lo_z0 ||
| 14 | hi_z3 || lo_z3 || hi_z2 || lo_z2 ||
| 15 | hi_z5 || lo_z5 || hi_z4 || lo_z4 ||

1400- Child node volume data required for internal node

1401- Issue request to memory system for child node volume data

1402- Obtain child node volume data from memory system in encoded form

1403- Decode child node volume data to determine associated volume for child node for use in ray-volume intersection testing

FIG. 14

|  | 31-28 | 27-24 | 23-20 | 19-16 | 15-12 | 11-8 | 7-5 | 3-0 |
|---|---|---|---|---|---|---|---|---|
| 0 | | | | tri_0_vertex_0_x | | | | |
| 1 | | | | tri_0_vertex_0_y | | | | |
| 2 | | | | tri_0_vertex_0_z | | | | |
| 3 | | | | tri_0_vertex_1_x | | | | |
| 4 | | | | tri_0_vertex_1_y | | | | |
| 5 | | | | tri_0_vertex_1_z | | | | |
| 6 | | | | tri_0_vertex_2_x | | | | |
| 7 | | | | tri_0_vertex_2_y | | | | |
| 8 | | | | tri_0_vertex_2_z | | | | |
| 9 | | | | tri_1_vertex_0_x | | | | |
| 10 | | | | tri_1_vertex_0_y | | | | |
| 11 | | | | tri_1_vertex_0_z | | | | |
| 12 | | | | tri_1_vertex_1_x | | | | |
| 13 | | | | tri_1_vertex_1_y | | | | |
| 14 | | | | tri_1_vertex_1_z | | | | |
| 15 | | | | tri_1_vertex_2_x | | | | |
| 16 | | | | tri_1_vertex_2_y | | | | |
| 17 | | | | tri_1_vertex_2_z | | | | |
| 18 | | | | tri_2_vertex_0_x | | | | |
| 19 | | | | tri_2_vertex_0_y | | | | |
| 20 | | | | tri_2_vertex_0_z | | | | |
| 21 | | | | tri_2_vertex_1_x | | | | |
| 22 | | | | tri_2_vertex_1_y | | | | |
| 23 | | | | tri_2_vertex_1_z | | | | |
| 24 | | | | tri_2_vertex_2_x | | | | |
| 25 | | | | tri_2_vertex_2_y | | | | |
| 26 | | | | Reserved | | | | |
| 27 | | | | Reserved | | | | |
| 28 | | | | Reserved | | | | |
| 29 | | | | Reserved | | | | |
| 30 | | | | Reserved | | | | |
| 31 |  | V2 |  | O2 | V1 |  | O1 | V0 | O0 |

FIG. 15

GRAPHICS PROCESSING

CROSS-REFERENCE TO RELATED APPLICATIONS

This application claims priority pursuant to 35 U.S.C. 119(a) to United Kingdom Patent Application No. 2108050.2, filed Jun. 4, 2021, which application is incorporated herein by reference in its entirety.

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value, e.g., sampling point in the image, is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation.

The Applicants believe that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which:

FIG. 13 illustrates how child node volume data for an internal (non-leaf) node of a ray tracing acceleration data structure may be stored in memory;

FIG. 14 is a flowchart showing how child node volume data for an internal (non-leaf) node of a ray tracing acceleration data structure may be obtained from memory according to an embodiment of the technology described herein; and FIG. 15 illustrates how primitive data for a leaf node of a ray tracing acceleration data structure may be stored in memory.

Like reference numerals are used for like elements in the Figures where appropriate.

DETAILED DESCRIPTION

Figure 1:
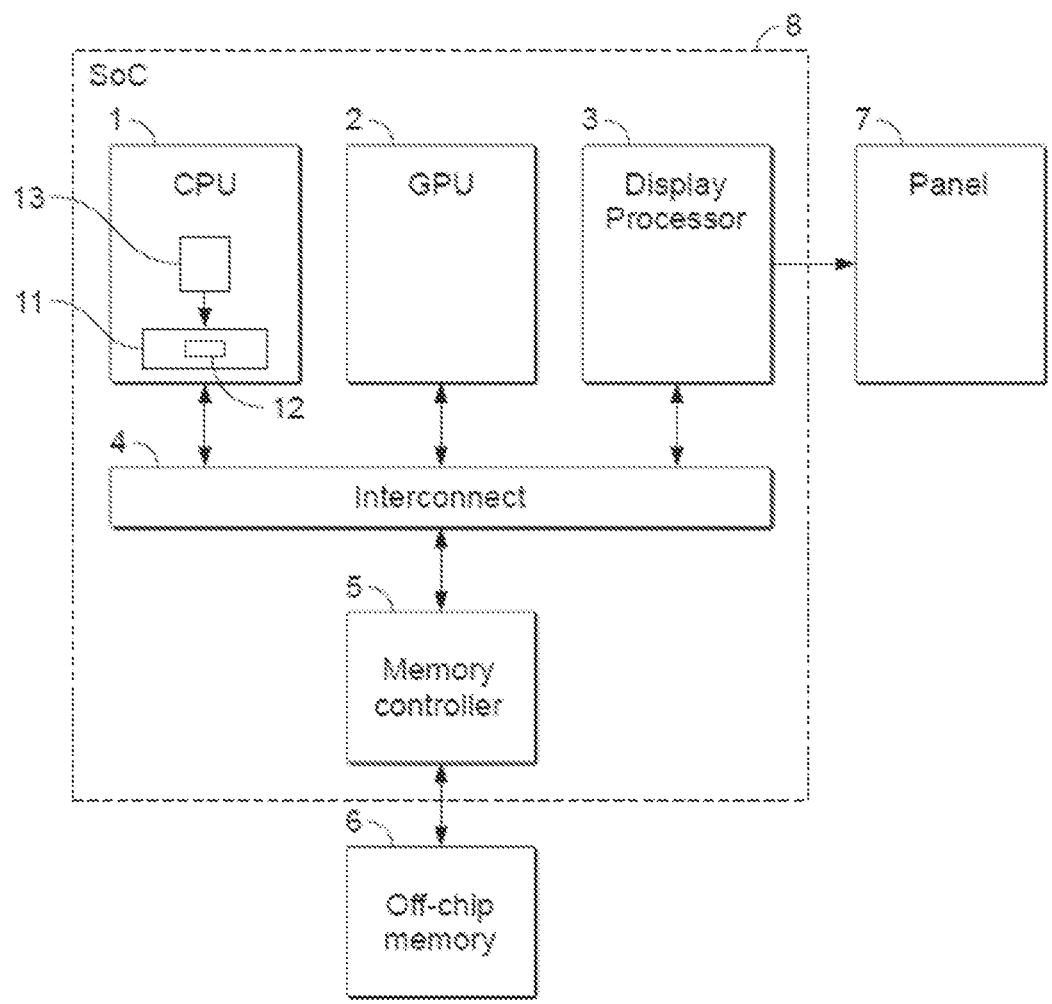
FIG. 1 shows an exemplary graphics processing system.

A first embodiment of the technology described herein comprises a method of operating a graphics processing system including a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays; the graphics processor comprising a programmable execution unit operable to execute programs to perform graphics processing operations, and in which a program can be executed by groups of plural execution threads together; the method comprising: including in a program to perform a ray tracing acceleration data structure traversal, wherein the program is to be executed by a group of plural execution threads, with individual execution threads in the group of execution threads performing a traversal operation for a respective ray in a corresponding group of rays such that the group of rays performs the ray tracing operation together, a set of one or more 'ray-volume testing' instructions for testing rays for intersection with the one or more volumes associated with a given node of the ray tracing acceleration data structure that is to be tested during the traversal operation, which set of 'ray-volume testing' instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation; the method further comprising, when a group of execution threads is executing the program for a corresponding group of rays that are performing a traversal of the ray tracing acceleration data structure together, in response to the execution threads executing the set of one or more 'ray-volume testing' instructions in respect of a node of the ray tracing acceleration data structure: testing one or more rays from the group of plural rays that are performing the traversal operation together for intersection with the one or more volumes associated with the node being tested; and returning a result of the intersection testing for the node for the traversal operation.

A second embodiment of the technology described herein comprises a graphics processing system comprising a graphics processor that is operable to render a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays; the graphics processor comprising: a programmable execution unit operable to execute programs to perform graphics processing operations, and in which a program can be executed by groups of plural execution threads together; and the graphics processing system further comprising: a processing circuit that is configured to: include in a program to perform a ray tracing acceleration data structure traversal, wherein the program is to be executed by respective groups of plural execution threads together, with individual execution threads in a group of execution threads performing a traversal operation for a respective ray in a corresponding group of rays such that the group of rays performs the traversal operation together, a set of one or more 'ray-volume testing' instructions for testing rays for intersection with the one or more volumes associated with a given node of the ray tracing acceleration data structure that is to be tested during the traversal operation, which set of 'ray-volume testing' instructions, when executed by execution threads of a group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation; wherein the execution unit is configured such that, when a group of execution threads is executing the program for a corresponding group of rays that are performing a traversal of the ray tracing acceleration data structure together, in response to the execution threads executing the set of one or more 'ray-volume testing' instructions in respect of a node of the ray tracing acceleration data structure: the execution unit triggers testing of one or more rays from the group of plural rays that are performing the traversal of the ray tracing acceleration data structure together for intersection with the one or more volumes associated with the node being tested, wherein a result of the intersection testing is then returned for the node for the traversal operation.

The technology described herein broadly relates to the performing of ray tracing on a graphics processor in order to render a frame that represents a view of a particular scene. When performing a ray tracing operation, for each ray that is being used to render a sampling position in the frame that is being rendered, in order to render the sampling position, it first needs to be determined which geometry that is defined for the scene is intersected by the ray (if any).

There are various ways in which this can be done, as desired. However, in general, there may be many millions of graphics primitives within a given scene, and millions of rays to be tested, such that it is not normally practical to test every ray against each and every graphics primitive. To speed up the ray tracing operation the technology described herein therefore uses a ray tracing acceleration data structure, such as a bounding volume hierarchy (BVH), that is representative of the distribution of the geometry in the scene that is to be rendered to determine the intersection of rays with geometry (e.g. objects) in the scene being rendered (and then renders sampling positions in the output rendered frame representing the scene accordingly).

The ray tracing operation according to the technology described herein therefore generally comprises performing a traversal of the ray tracing acceleration data structure for a plurality of rays that are being used for the ray tracing process, which traversal involves testing the rays for intersection with the volumes represented by the different nodes of the ray tracing acceleration data structure in order to determine with reference to the node volumes which geometry may be intersected by which rays for a sampling position in the frame for the scene that is being rendered, and which geometry therefore needs to be further processed for the rays for the sampling position.

The ray tracing acceleration data structure traversal operation therefore involves traversing the nodes of the ray tracing acceleration data structure, testing rays for intersection with the volumes associated with the nodes, and maintaining a record of which node volumes are intersected by which rays, e.g. to determine which nodes should therefore be tested next for the ray, and so on, down to the end nodes, e.g., at the lowest level, of the ray tracing acceleration data structure.

For example, and in an embodiment, the ray tracing acceleration data structure comprises a tree structure that is configured such that each leaf node of the tree structure represents a set of primitives defined within the respective volume that the leaf node corresponds to, and with the non-leaf nodes representing hierarchically-arranged larger volumes up to a root node at the top level of the tree structure that represents an overall volume for the scene in question that the tree structure corresponds to. Each non-leaf node is therefore in an embodiment a parent node for a respective set of plural child nodes with the parent node volume encompassing the volumes of its respective child nodes. In an embodiment, each (non-leaf) node is therefore associated with a respective plurality of child node volumes, each representing a (in an embodiment non-overlapping) sub-volume within the overall volume represented by the node in question.

In that case, the ray tracing acceleration data structure can thus be (and in an embodiment is) traversed by proceeding down the branches of the tree structure and testing the rays against the child volumes associated with a node at a first level of the tree structure to thereby determine which child nodes in the next level of the tree structure should be tested, and so on, down to the level of the respective leaf nodes at the end of the branches of the tree structure.

That is, in embodiments, where the ray tracing acceleration data structure comprises a tree structure of this type, the testing of the one or more rays against the volume associated with a node comprises testing the rays against each of the child node volumes associated with the node, and outputting a result of the testing for each of the child nodes of the node in question.

(For ease of explanation various embodiments will accordingly be described wherein the ray-volume intersection testing for a node involves testing one or more rays against each of the child node volumes of the node in question. However, it will be appreciated that other arrangements would be possible, e.g. depending on how the ray tracing acceleration data structure is configured and the one or more volumes that are tested for a given node may be any suitable volumes associated with the node such as the volume represented by the node itself rather than the volumes represented by its child nodes.)

Once it has been determined by performing such a traversal operation for a ray which end nodes represent geometry that may be intersected by a ray, the actual geometry intersections for the ray for the geometry that occupies the volumes associated with the intersected end nodes can be determined accordingly, e.g. by testing the ray for intersection with the individual units of geometry (primitives) defined for the scene that occupy the volumes associated with the leaf nodes. Once the geometry intersections for the rays being used to render a sampling position have been determined, it can then be (and is) determined what appearance the sampling position should have, and the sampling position rendered accordingly.

The ray-primitive intersection testing is generally relatively more computationally expensive. The use of the ray tracing acceleration data structure in the technology described herein therefore allows the ray tracing operation to be accelerated.

For instance, rather than testing a ray against each and every individual primitive within the scene, a ray that is being used for the ray tracing process can instead be tested for intersection at a higher level against the volumes represented at each level of the tree data structure, and for any rays that do not intersect a given node in a particular branch of the tree structure it can be determined that the ray does not intersect the geometry falling within the branch of the tree structure including that node, without further testing of the ray against the geometry in the lower levels of the tree.

The use of such a ray tracing acceleration data structure in the technology described herein can therefore be effective in speeding up the overall ray tracing operation.

However, the Applicants have recognised that there is still scope for improvement in this regard.

In particular, the technology described herein recognises that when performing a traversal of the ray tracing acceleration data structure for a ray, in typical cases, the ray tracing acceleration data structure is, or at least can be, configured such that the majority of the processing time is spent performing the intersection testing with the volumes of the nodes of the ray tracing acceleration data structure, and that this ray-volume testing may therefore require the bulk of the processing effort.

Furthermore, loading in the required data for each of the rays being used for the ray tracing process for performing such ray-volume intersection testing can involve relatively high memory bandwidth.

The technology described herein therefore aims to improve the overall efficiency of the ray-volume intersection testing operations that are required to be performed when performing a traversal of the ray tracing acceleration data structure during the ray tracing operation.

This is achieved in the technology described herein by having a group of plural rays that are being used for the ray tracing process perform a traversal of the ray tracing acceleration data structure together, as part of a single traversal operation.

This has the effect and benefit that multiple rays in the group of plural rays that are performing the traversal at the same time can then be tested against a given node of the ray tracing acceleration data structure in one processing instance, thus reducing the number of memory access operations.

For instance, this means that where there are multiple rays in the group of plural rays that should be tested for a given node, all of those rays can be tested against the node in a single testing instance. Correspondingly this then means that the graphics processor is able to load in all of the data for those rays from memory in one go, e.g. in a single memory load operation.

Likewise, the result of the intersection testing can be returned for all of the rays (and all of the volumes) being tested, and then stored accordingly.

In this way it is possible to reduce the overall number of memory access operations that may be required for testing all of the rays, e.g. at least compared to other possible arrangements where the traversal and ray-volume testing is performed in respect of individual rays, and which arrangements may therefore require a significant number of memory accesses for loading in (and subsequently writing out) the required data for each of the rays for each instance of intersection testing.

This also therefore allows processing resource for the group of rays to be shared. For instance, and in an embodiment, by performing the traversal operation for a group of rays together, the traversal operation can thus be managed using a single, common data structure (a 'traversal record') for the group of rays that tracks which nodes are associated with geometry that is potentially intersected by the rays in the group of rays (and which nodes/geometry thus needs to be tested (next) for the traversal operation).

Again, this can further reduce memory bandwidth since there is in embodiments a single data structure (e.g. a common record of which nodes (geometry) are potentially intersected by rays in the group of rays, which record may generally take any suitable form but is in an embodiment is in the form of a 'stack') that manages the traversal operation for the whole group of rays, thus reducing the number of memory accesses, e.g. compared to other possible arrangements wherein respective data structures (e.g. stacks) are provided for the individual rays, e.g. as may be required if the rays are performing the traversal operation independently.

This can also in embodiments facilitate managing the traversal operation via local registers, again reducing the need to access external memory. For instance, and in embodiments, the traversal operation can be managed via a set of common registers allocated to the execution thread group in which the shared traversal record (the traversal data structure, e.g. stack) for the group of rays is maintained, as will be explained further below.

The approach according to the technology described herein can therefore provide various benefits especially in terms of reducing memory bandwidth.

Thus, in the technology described herein, the ray tracing traversal operation is performed for a group of plural rays together. In particular, the ray tracing traversal program is executed by a group of plural execution threads, with each ray in the group of plural rays being processed by a corresponding execution thread in a group of plural execution threads that are executing the program at the same time.

Furthermore, each of the execution threads (for each of the rays in the group) are in an embodiment arranged to continue executing the program for the traversal operation (i.e. so that all of the threads in the execution thread group are, and remain, in an 'active' state) until the group of rays as a whole has completed the traversal of the ray tracing acceleration data structure.

In other words, in the technology described herein, the whole execution thread group for the group of plural rays is in an embodiment kept 'active' such that all of the rays in the group of plural rays effectively perform the traversal operation together, as a group, even if it is determined that a given ray in the group of plural rays does not intersect any geometry in the ray tracing acceleration data structure (such that the execution thread processing that ray could in principle be retired/terminated from that point).

To facilitate this, one or more instructions are included in the program that cause the execution threads to be and remain in the active state, at least until all of the rays in the group of rays that are performing the traversal operation together have finished the traversal, e.g. at least until it has been determined for all of the rays which geometry may be intersected by the rays.

Thus, in embodiments, the method comprises (and the processing circuit of the graphics processing system is configured to perform a step of) including in a program to perform a ray tracing acceleration data structure traversal, wherein the program is to be executed by a group of plural execution threads, with individual execution threads in the group of execution threads performing a traversal operation for a respective ray in a corresponding group of rays, a set of one or more instructions that cause the execution threads in the group of execution threads to be in an active state at least until the traversal operation to determine which, if any, geometry for the scene may be intersected by the rays is finished for all of the rays in the group of rays being processed by the group of execution threads. In this way, the group of rays is caused to perform the (entire) traversal operation together.

This could be achieved in any suitable manner, as desired. For instance, the program instructions may be arranged such that it is ensured that the threads are not caused to diverge, or be terminated, and thus remain in the active state for the traversal operation. Or, and in some embodiments, explicit instructions, or instruction modifiers, may be included into the program that when executed force all of the execution threads in the execution thread group to be in the active state (e.g. such that if an execution thread in the execution thread group had terminated, the thread can be brought back into the active state for the traversal operation). Various arrangements would be possible in that regard.

When a group of execution threads are in the active state, processing operations can then be performed using the group of threads as a whole, e.g. with processing resource shared across the thread groups. For example, all of the execution threads may be arranged to perform the same processing operation, but for different data points, e.g., in a single instruction, multiple data (SIMD) execution state.

Ensuring that all of the threads that are performing the traversal operation for a respective ray in the group of rays are in an active state may help to simplify the implementation of the traversal operation and has the additional benefit that the traversal operation can then be, and in an embodiment is, managed for the group of plural rays as a whole, e.g. using a shared data structure.

Thus, in the technology described herein, all of the execution threads for the rays in the group of plural rays in an embodiment remain active at least until all of the required ray-volume intersection testing for the rays in the group of plural rays has been performed to determine which geometry may be intersected by the ray (or, correspondingly, if it is determined during the traversal that none of the rays intersect any of the geometry, such that there is a 'miss', the traversal operation is then finished once it has been determine that none of the rays in the group intersect any geometry).

In some embodiments the execution threads for all of the rays in the group of plural rays remain active beyond the initial traversal operation to determine which geometry may be intersected by the rays, e.g., and in an embodiment, also remain active for the subsequent testing of the rays against the individual units of geometry (primitives) contained within the volumes that it is determined that the rays intersect.

That is, in embodiments, both the ray-volume intersection testing that is performed during the traversal operation to determine which geometry may be intersected and the subsequent ray-primitive intersection testing that is performed to determine the actual geometry intersections is performed for a group of plural rays as a whole.

In an embodiment both of these operations are triggered by the same shader program. For instance, the program is in an embodiment executed by a group of plural execution threads for a corresponding group of rays that are thereby arranged to perform the traversal of the ray tracing acceleration data structure together to determine a set of volumes (e.g. the leaf node volumes of a tree structure) representing respective subsets of geometry that may be intersected by at least one ray in the group of plural rays and also causes the graphics processor to perform the required ray-primitive intersection testing for the geometry occupying those volumes to determine the actual geometry intersections (if any)

These steps may be performed separately, e.g. in sequence, e.g. such that it is first determined which subsets of geometry (e.g. which end nodes of the ray tracing acceleration data structure) may be intersected, and then only after all of the traversals for all of the rays in the group of rays performing the traversal to determine which end nodes represent volumes containing geometry that may be intersected by a ray in the group of plural rays have finished, is the graphics processor then caused to perform the required ray-primitive intersection testing for the rays in respect of those nodes.

However, it would also be possible to perform these steps in parallel, as part of the same overall traversal operation, and this is done in embodiments. For instance, as part of the ray tracing program execution, during a traversal of the ray tracing acceleration data structure, depending on whether a given node to be tested corresponds to a parent node in the ray tracing acceleration data structure or an end (leaf) node at the lowest level of the ray tracing acceleration data structure, the graphics processor may then perform the required ray-volume and/or ray-primitive intersection testing accordingly.

For example, in response the traversal operation reaching a parent node, the graphics processor may then be caused to test the rays in the group of plural rays against the respective one or more child volumes associated with that node to determine which child nodes should be tested against (the ray-volume intersection testing). On the other hand, in response to the traversal operation reaching an end node of the ray tracing acceleration data structure, the graphics processor may then test the rays for intersection with the individual units of geometry (primitives) represented by the end node in question (the ray-primitive intersection testing).

Thus, in embodiments, the ray-primitive testing in respect of a particular end node for one (a first) branch of the tree may be performed before the traversal operation has fully worked through all of the branches of the tree structure to determine which other, if any, end nodes may be intersected by the rays.

For instance, the traversal operation may be performed such that the traversal in an embodiment works down a first branch of the tree structure to determine whether there is any geometry for the branch that is potentially intersected and then proceeds to determine the actual geometry intersections for that branch, before moving to the next (i.e. the adjacent) branch, and so on.

Thus, the traversal operation that is performed for a group of plural rays according to the technology described herein in an embodiment comprises both the ray-volume testing to determine which geometry (e.g. which leaf node volumes) may be intersected by the rays in the group of plural rays for which the traversal is being performed and the ray-primitive intersection testing to determine the actual geometry intersections.

This may help simplify the traversal operation, e.g. by allowing both operations to be managed using the same data structure (e.g. the same traversal record), thus avoiding the need to store out any data in between the ray-volume and ray-primitive testing operations.

However, this is not necessary, and it would also be possible for the group of rays to perform the traversal operation up to and including the step of determining, by performing suitable ray-volume intersection testing, which geometry may be intersected by the rays in the group of rays as a whole, together, but for the rays to, e.g., then be re-grouped for the ray-primitive intersection testing, or, e.g., for the ray-primitive testing to be performed instead for individual rays.

To further facilitate improving the efficiency of the ray-volume intersection testing that is to be performed during a traversal operation, the technology described herein also provides a dedicated set of one or more 'ray-volume testing' instructions that can be included within a shader program for the ray tracing operation, and which set of instructions cause the graphics processor to perform the required intersection testing between one or more rays within the group of plural rays that are performing the traversal together and the volumes associated with a node of the ray tracing acceleration data structure for the rays for which the shader program is being executed, e.g. as above.

The use of an instruction for performing the ray-volume intersection testing may be beneficial in itself in terms of improving the efficiency of the program compilation/execution, e.g. as there may generally be a huge number of such tests that need to be performed, such that the use of a dedicated instruction that can be included into the program to trigger such testing can help reduce the complexity of the shader program. Thus, whenever ray-volume intersection testing is required in respect of a node of the ray tracing acceleration data structure, the instruction can be included appropriately into the generated program to cause the graphics processor to perform the required ray-volume intersection testing.

In response to executing such ray-volume intersection testing instruction, the relevant input data defining the rays to be tested can then be loaded in, together with data indicative of the volumes associated with the node that is being tested against, and the ray-volume intersection testing can then be performed accordingly.

Subject to the requirements of the technology described herein, the ray-volume intersection testing itself can generally be performed in any suitable way, as desired, e.g. in the normal way for such ray tracing operations and for the graphics processor and graphics processing system in question.

The ray-volume intersection testing thus in an embodiment takes as input a node of the ray tracing acceleration data structure that is desired to be tested (which node will typically be a parent or non-leaf node) against and then tests one or more rays in the group of plural rays that are performing the traversal together for intersection against one or more volumes associated with the node being tested.

For example, as mentioned above, in the case of a tree structure, the rays may be, and in an embodiment are, tested for intersection against each of the child node volumes of the node in question. This means that when the ray-volume intersection testing instruction is executed, the graphics processor can then, and in an embodiment does, test multiple rays from the group of plural rays against the volumes for plural child nodes of the node in question, in one processing instance (e.g., and in an embodiment, with one load operation for loading all of the data for this testing and a single output for all of the testing). For instance, and for this reason, in embodiments, the ray tracing acceleration data structure comprises a relatively 'wide' tree structure. In an embodiment, each parent node in the tree may have up to six respective child nodes. In such cases the testing is in an embodiment performed iteratively for each ray for each child node volume until all of the rays in the group of rays have been tested against each child node volume. The result of the ray-volume intersection testing is then returned appropriately for the program performing the traversal operation to continue.

In this way, by being able to test multiple rays in a single testing operation, in an embodiment against multiple (child node) volumes, it is therefore possible to improve the overall speed of the ray-volume testing, at least on average.

On the other hand, by having all of the execution threads remain in an active state during the traversal, such that the plural rays perform the traversal as a group, this may then mean that some of the rays in the group of plural rays that perform the traversal do not intersect with a given node that is being tested, and it may even be the case that some of the rays in the group do not intersect with any of geometry for the scene for which the ray tracing acceleration data structure is defined (such that the corresponding execution threads processing those rays could in principle be retired at the point that is determined).

Maintaining all of the execution threads (for all of the rays) in the group in an active state such that the whole group of rays performs the traversal together may therefore result in some unnecessary processing in carrying those rays through the traversal operation.

However, in this respect the technology described herein further recognises that many rays will need to be tested for intersection with the same, or similar, volumes, at least in the higher levels of the ray tracing acceleration data structure.

For example, it may be expected that, or the graphics processor may be arranged to group plural rays such that, rays that are processed together as a group by a corresponding group of execution threads will show a high degree of 'coherency', e.g., such that they are expected to intersect similar geometry. Various arrangements would be possible in this regard for pooling rays and selecting rays from the pool as a suitable group of plural rays, as will be explained further below.

Thus, arranging for a group of plural rays to traverse the ray tracing acceleration data structure together can generally work well to provide an overall more efficient ray tracing operation.

That is, it has been found that in many ray tracing operations, the benefits of performing the traversal for a whole group's worth of rays together in terms of allowing for more rays to be tested in a single operation, with reduced memory bandwidth, typically outweigh the cost of any unnecessary processing that may be performed in order to keep all of the execution threads active during the traversal.

Moreover, the Applicants have recognised that performing the traversal operation for a group of rays as a whole, such that the corresponding execution thread group for the group of rays as a whole remains active can in embodiments provide yet further improvements in terms of reducing memory bandwidth.

In particular, by keeping all of the execution threads in the execution thread group that is processing the group of plural rays active in this way, it is then possible to manage the traversal operation for the group of rays as a whole, e.g., and in an embodiment, using a set of shared (e.g. general purpose) registers allocated for the execution thread group.

For instance, as mentioned above, the traversal operation itself may be, and in an embodiment is, managed using an appropriate record, e.g. with the traversal record comprising a list of entries indicating which nodes have been determined to be intersected by the rays in the group of plural rays that are performing the traversal.

For example, and in an embodiment, in order to track which nodes are intersected by which rays, and therefore need to be tested against the ray, whenever it is determined that a ray that is being used for the ray tracing process intersects a given node, an indication that the node (volume) is intersected is then pushed (added) to a suitable record for the traversal operation. The record of which nodes represent volumes that contain geometry that might be intersected by a ray can then be read to determine which nodes need to be tested at the next level, and so on.

In an embodiment, the record for the traversal operation is provided in the form of a suitable traversal 'stack', and is in an embodiment managed using a 'last-in-first-out' scheme, e.g. in the normal way for a stack.

Thus, when the testing of a first parent node indicates that one or more of its child nodes are intersected, the child nodes are then pushed (added) to the stack, and then popped out (removed) for testing accordingly (such that the child nodes of the first parent node are tested before testing any other parent nodes at the same level as the first parent node). However, various other arrangements would be possible for tracking which nodes are to be tested and the traversal record may in general be arranged and managed in any suitable manner, as desired.

As explained above, because in the technology described herein the traversal of the ray tracing acceleration data structure is performed for a plurality of rays together, such that all of the execution threads processing the rays in the group of plural rays remain 'active' during the traversal, this means that a single, common traversal record can be maintained for the group of rays as a whole. Furthermore, because the execution thread group as a whole is in an embodiment kept active, it is possible, and it is a benefit of the technology described herein, that the traversal record can be managed entirely using a set of registers that have been allocated for the group of plural execution threads, such that the traversal operation for all of the rays being processed by the group of plural execution threads can be handled using registers.

This can therefore further reduce memory bandwidth requirements, e.g. compared to maintaining a separate record for each ray. For instance, rather than each ray having its own traversal record that is maintained in external memory, and the graphics processor having to always write out the result of the intersection testing for each ray to its respective (per-ray) record in memory, as may otherwise be done, in embodiments of the technology described herein, because the traversal is performed for a group of rays as a whole, the result of the intersection testing for the rays in the group can be (and in an embodiment is) written out to a shared traversal record that is in an embodiment maintained in a set of local registers that have been allocated for the execution thread group that is processing the group of plural rays performing the traversal, such that the traversal record is managed for the whole group of plural rays, e.g. rather than having to repeatedly read in respective records for the individual rays from memory, thus reducing memory bandwidth.

In this way the traversal stack can in an embodiment be managed (entirely) via the registers, in an embodiment on-chip, with the stack only being written out from the registers to memory in the event of overflow.

Thus, in embodiments, the traversal stack is managed, in an embodiment entirely, using the allocated registers for the thread group. In this way, where it is possible to do so, the state of the traversal record can be held entirely locally to the graphics processor, thus reducing memory bandwidth. The size of the data structures can be designed to try to ensure this is the case, at least in normal operation. In that case, the output of the ray-volume intersection testing (i.e. the node (volumes) that are intersected by a ray and therefore need to be tested for the traversal operation) is in an embodiment pushed to the traversal record without being written to memory.

In an embodiment, the output of the intersection testing is only written to memory when writing a result of the intersection testing to the record would cause an overflow of the record. For instance, the traversal record generally has a finite number of entries (e.g., and especially where it is managed using the registers, which typically have a fixed size). For example, in an exemplary embodiment, the traversal record may be 8 entries deep.

Thus, if a particular instance of ray-volume testing results in a large number of intersections, writing a result for each of the determined intersections may cause the traversal record to overflow. In that case, the entire traversal record is in an embodiment copied to the overflow output, e.g. and then written out to memory in its current form. A suitable indicator of the overflow state is then in an embodiment outputted and included into the traversal record, such that the entries that were written out to memory because of the overflow can be loaded back in for testing to allow the entries into the stack. Thus, in the event of a record overflow, the current record is written to memory and then cleared, and an indication that this has happened is included into the record.

For instance, and in an embodiment, the overflow state is also (always) returned as output for the ray-volume intersection testing. Because the record is in an embodiment written out as a whole, the overflow output will always be either zero or not zero so it is easy to detect when overflow has occurred (e.g. rather than trying to identify which pushes caused overflow, etc.).

In the technology described herein, the traversal record is thus in an embodiment maintained locally via the registers, without necessarily having to access external memory other than in overflow situations.

Thus, in embodiments, when it is desired to perform intersection testing for one or more rays in the group of plural rays that are performing the traversal operation together in one go (using a single memory load operation), the data for those rays can be loaded in one go, and the result of the intersection testing can then be outputted to the traversal record that is being maintained via the registers for the execution thread group as a whole (without necessarily having to write out to memory other than in overflow situations).

In this way the efficiency of the ray-volume intersection testing operations, in particular by reducing the memory bandwidth requirements for performing the ray-volume intersection testing and for managing the traversal, can be improved.

The effect of all of this then is that the overall ray tracing rendering process can be performed more efficiently, thereby facilitating, for example, performing ray tracing and/or improved ray tracing, e.g. on devices whose processing resources may be more limited.

The technology described herein may therefore provide various improvements compared to other possible approaches.

The technology described herein relates to the situation where a frame that represents a view of a scene comprising one or more objects is being rendered using a ray tracing process.

In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process.

In this case, the operation in the manner of the technology described herein may be, and is in an embodiment, used when and for analysing the intersections of the secondary rays with objects in the scene.

The ray-tracing based rendering of a frame that is performed in the technology described herein is triggered and performed by the programmable execution unit of the graphics processor executing a graphics processing program that will cause (and that causes) the programmable execution unit to perform the necessary ray tracing rendering process.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

In a graphics processing system that is operable in the manner of the technology described herein, in embodiments of the technology described herein at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering, and as part of that program execution exchanging the messages discussed above with the ray tracing acceleration data structure traversal circuit of the graphics processor.

The operation of the technology described herein can be (and is) implemented and triggered by including appropriate 'ray-volume' intersection testing instructions in the ray tracing rendering shader program to be executed by the programmable execution unit that will trigger the desired ray-volume intersection testing to be performed, e.g., and in embodiments, by triggering the execution unit to send an appropriate message to the intersection testing circuit (with the execution unit then sending the message when it reaches (executes) the relevant instruction in the shader program). (Appropriate instructions for causing the execution threads to be in the active state, and also for performing the ray-primitive testing, at least where this is triggered by the same shader program, can also be included appropriately into the shader program).

Such instructions can be included in a shader program to be executed by the programmable execution unit in any suitable and desired manner and by any suitable and desired element of the overall data (graphics) processing system.

For instance, in an embodiment, the "ray-volume" intersection testing instruction is included in the shader program by the compiler (the shader compiler) for the graphics processor. Thus the compiler in an embodiment inserts a "ray-volume" intersection testing instruction at the appropriate point in the ray tracing rendering shader program that is performing the ray tracing.

In an embodiment, a "ray-volume" intersection testing is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray-volume intersection testing instruction in respect of a node during the ray tracing operation, with the compiler then, in the technology described herein, including an appropriate "ray-volume" intersection testing instruction in the compiled shader program in response to that. It may also be possible for the compiler to include "ray-volume" intersection testing instruction of its own accord, e.g. in the case where the compiler is able to assess the shader program being compiled to identify when and where to include a "ray-volume" intersection testing instruction or instructions, even in the absence of an explicit indication of that.

In an embodiment, the compiler analyses the shader program code that is provided, e.g. by the application on the host processor that requires the graphics processing, and includes a "ray-volume" intersection testing instruction or instructions at the appropriate point(s) in the shader program (e.g. by inserting the instruction(s) in the (compiled) shader program).

The technology described herein also extends to and includes such operation of a compiler.

Thus, a further embodiment of the technology described herein comprises a method of compiling a shader program to be executed by a programmable execution unit of a graphics processor that is operable to execute graphics processing programs to perform graphics processing operations; the method comprising: for a shader program to be executed by a programmable execution unit of a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays, and wherein the program is to be executed by a group of plural execution threads, with individual execution threads in the group of execution threads performing a traversal operation for a respective ray in a corresponding group of rays: including in the shader program a set of one or more 'ray-volume testing' instructions for testing rays for intersection with the one or more volumes associated with a given node of the ray tracing acceleration data structure that is to be tested during the traversal operation, which set of 'ray-volume testing' instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation.

A further embodiment of the technology described herein comprises a compiler for compiling a shader program to be executed by a programmable execution unit of a graphics processor that is operable to execute graphics processing programs to perform graphics processing operations; the compiler comprising a processing circuit configured to: for a shader program to be executed by a programmable execution unit of a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays, and wherein the program is to be executed by groups of plural execution threads, with individual execution threads in the group of execution threads performing a traversal operation for a respective ray in a corresponding group of rays: include in the shader program: a set of one or more 'ray-volume testing' instructions for testing rays for intersection with the one or more volumes associated with a given node of the ray tracing acceleration data structure that is to be tested during the traversal operation, which set of ray-volume testing instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation.

In an embodiment the compiler also includes in the program a set of one or more instructions that cause the execution threads in the group of execution threads to be in an active state at least until the traversal operation to determine which, if any, geometry for the scene may be intersected by the rays is finished for all of the rays in the group of rays being processed by the group of execution threads, such that the group of rays performs the traversal operation together, as described above.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

The compilation process (the compiler) can generate the ray tracing rendering shader program in any suitable and desired manner, e.g., and in an embodiment, using any suitable and desired compiler techniques for that purpose.

Thus, in an embodiment, the shader program is generated by the compiler, and the compiler is arranged to include within the shader program the instructions that are used in the technology described herein. Other arrangements would, of course, be possible.

The generated shader program can then be issued to the programmable execution unit of the graphics processor for execution thereby.

The technology described herein also extends to the operation of the graphics processor itself when executing the shader program.

A further embodiment of the technology described herein comprises a method of operating a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays; the graphics processor comprising a programmable execution unit operable to execute programs to perform graphics processing operations, and in which a program can be executed by groups of plural execution threads together; the method comprising: when a group of execution threads is executing a program to perform a ray tracing acceleration data structure traversal, with individual execution threads in the group of execution threads performing a traversal operation for a respective ray in a corresponding group of rays such that the group of rays performing the traversal operation together, in response to the execution threads executing a set of one or more 'ray-volume testing' instructions that are included in the program in respect of a node of the ray tracing acceleration data structure: testing one or more rays from the group of plural rays that are performing the traversal operation together for intersection with the one or more volumes associated with the node being tested; and returning a result of the intersection testing for the node for the traversal operation.

A yet further embodiment of the technology described herein comprises a graphics processor that is operable to render a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays; the graphics processor comprising: a programmable execution unit operable to execute programs to perform graphics processing operations, and in which a program can be executed by groups of plural execution threads together; wherein the execution unit is configured such that, when a group of execution threads is executing a program to perform a ray tracing acceleration data structure traversal, with individual execution threads in the group of execution threads performing a traversal operation for a respective ray in a corresponding group of rays that are thereby performing the traversal operation together, in response to the execution threads executing a set of one or more 'ray-volume testing' instructions included in the program in respect of a node of the ray tracing acceleration data structure: the execution unit triggers testing of one or more rays from the group of plural rays that are performing the traversal of the ray tracing acceleration data structure together for intersection with the one or more volumes associated with the node being tested, wherein a result of the intersection testing is then returned for the node for the traversal operation.

As will be appreciated by those skilled in the art, these additional embodiments of the technology described herein relating to the operation of the compiler and/or the graphics processor can, and in an embodiment do, include any one or more or all of the features of the technology described herein described herein, as appropriate.

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

The graphics processor can be any suitable and desired graphics processor that includes a programmable execution unit (circuit) that can execute program instructions.

The programmable execution unit can be any suitable and desired programmable execution unit (circuit) that a graphics processor may contain. It should be operable to execute graphics shading programs to perform graphics processing operations. Thus the programmable execution unit will receive graphics threads to be executed, and execute appropriate graphics shading programs for those threads to generate the desired graphics output.

Once a thread has finished its respective processing operation, the thread can then be 'retired', e.g. and a new execution thread spawned in its place.

The graphics processor may comprise a single programmable execution unit, or may have plural execution units. Where there are a plural execution units, each execution unit can, and in an embodiment does, operate in the manner of the technology described herein. Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

According to the technology described herein the graphics processor and the programmable execution unit are operable to execute shader programs for groups ("warps") of plural execution threads together, e.g. in lockstep, e.g., one instruction at a time. In that case, the execution threads in the execution thread group in an embodiment perform the same traversal operation, but for different rays, e.g., and in an embodiment, in a single instruction, multiple data (SIMD) execution state.

The groups of execution threads can therefore (and do) each process a corresponding group of plural of rays for the ray tracing operation.

According to the technology described herein, the graphics processor is thus configured to, and operable to, group rays (traversal requests) that are to traverse the same acceleration data structure together, so as to execute the traversals of the acceleration data structure for the rays of the group of rays together.

The grouping may be performed in any suitable fashion as desired, but in an embodiment rays that are sufficiently similar to each other and that are to traverse the same acceleration data structure are grouped together, so as to execute the traversals of the acceleration data structure for the rays of the group together. This will help to increase memory locality, and, accordingly, improve the effectiveness of any caching of the ray tracing acceleration data structure (and correspondingly reduce the number of off-chip memory accesses that may be required).

In this case, the rays are in an embodiment grouped together based on their similarities to each other, such that "similar" rays will be grouped together for this purpose. Thus rays are in an embodiment grouped for traversing the (same) ray tracing acceleration data structure together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

Thus, in an embodiment, rays can be, and are, grouped together for the ray tracing acceleration data structure traversal process if and when their positions (origins), directions, and/or ranges, are sufficiently similar (e.g., and in an embodiment, are within a particular threshold range or margin of each other) (and the rays are to traverse the same ray tracing acceleration data structure). This will then facilitate performing the ray tracing acceleration data structure traversals for similar rays together, thereby increasing memory access locality, etc., and thus making the ray tracing acceleration data structure traversal operation more efficient.

In order to facilitate this operation, the graphics processor can in an embodiment maintain a "pool" of rays that are waiting to traverse an acceleration data structure (e.g. in an appropriate queue or buffer (cache) on or accessible to the graphics processor), and select groups of one or more rays from that pool for processing, e.g., and in an embodiment, based on one or more or all of the criteria discussed above. A suitable execution thread group may then be spawned for the selected group of rays, and a program executed to cause the group of rays to perform the traversal operation together. This will then facilitate the ray tracing acceleration data structure traversal processing groups of similar rays together.

The graphics processor correspondingly in an embodiment comprises an appropriate controller operable to select and group rays for which ray tracing acceleration data structure traversals are to be performed from the "pool", and to cause ray tracing acceleration data structure traversals to be performed for groups of rays together.

In this case, rays that are in the "pool" and that are waiting to traverse a ray tracing acceleration data structure in an embodiment have their duration in the pool (their "ages") tracked, with any ray whose duration in the pool exceeds a particular, in an embodiment selected, in an embodiment predetermined, threshold duration ("age"), then being prioritised for processing, e.g., and in an embodiment, without waiting any further for later, "similar" rays to arrive for processing. This will then help to ensure that rays are not retained in the pool for too long whilst waiting for other rays potentially to group with the ray.

The rays in the pool may, for example, be time-stamped for this purpose so that their ages in the pool can be tracked. Other arrangements would, of course, be possible.

Once a group of rays to be processed together have been selected, then the rays should be processed together as a group, e.g. by spawning a suitable execution thread group, and causing the execution thread group to execute a program that causes the plural rays to traverse the ray tracing acceleration data structure together, in the manner described above.

The groups of rays for which the traversals of the ray tracing acceleration data structure are performed together can comprise any suitable and desired (plural) number of rays, although there may, e.g., and in an embodiment, be a particular, in an embodiment selected, in an embodiment defined, maximum number of rays for which the traversals may be performed together, e.g. depending upon the parallel processing capability of the ray tracing acceleration data structure traversal circuit in this regard.

Other arrangements would, of course, be possible.

Thus, in the technology described herein, the group of one or more execution threads comprises plural execution threads, and corresponds to a thread group (warp) that is executing the program in lockstep. In an embodiment, the group of execution threads comprises more than two execution threads, such as four, eight or sixteen (or more, such as 32, 64 or 128) execution threads.

The ray tracing operation according to the technology described herein is performed using a ray tracing acceleration data structure. The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form. In an embodiment the ray tracing acceleration data structure(s) comprise a tree structure, such as a bounding volume hierarchy (BVH) tree. The bounding volumes may be axis aligned (cuboid) volumes. Thus, in one embodiment, the ray tracing acceleration data structure comprises a bounding volume hierarchy, and in an embodiment a BVH tree.

The BVH is a tree structure with primitives (which may be triangles, or other suitable geometric objects) at the leaf nodes. The primitives at the leaf nodes are wrapped in bounding volumes. In an embodiment the bounding volumes are axis aligned bounding boxes. The bounding volumes are then recursively clustered and wrapped in bounding volumes until a single root node is reached. At each level of the recursion two or more bounding volumes may be clustered into a single parent bounding volume. For instance, and in an embodiment, each non-leaf node has a corresponding plurality of child nodes.

In an embodiment the ray tracing acceleration data structure used in the technology described herein comprises a 'wide' tree structure, in which each parent node may be (and in an embodiment is) associated with greater than two child nodes, such as three, four, five, six, or more, child nodes. In an embodiments each parent node may be associated with up to six child nodes. In that case, each instance of ray-volume intersection testing in an embodiment comprises testing one or more rays in the group of plural rays against each of the plural child nodes.

However, other suitable ray tracing acceleration data structures may also be used, as desired. For instance, rather than using a BVH hierarchy, where the scene is subdivided by volume on a per-object basis, e.g. by drawing suitable bounding volumes around subsets of geometry, e.g., and in an embodiment, such that each leaf node (volume) corresponds to a certain number of objects (primitives), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-object basis and in part on a per-volume basis. Various other arrangements would be possible and the technology described herein may in general be used with any suitable ray tracing acceleration data structure.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered.

It could also or instead be generated by a CPU (e.g. host processor), e.g. based on an indication of geometry for the scene, e.g. in a preliminary processing pass before the scene is rendered.

Other arrangements would, of course, be possible.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible.

The traversal operation can traverse the ray tracing acceleration data structure(s) for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question.

Thus, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In particular, the traversal process involves, for a ray (in the group of plural rays for which the traversal is being performed) that is being used for the ray tracing process, testing the ray for intersection with one or more (child node) volumes associated with a node of the ray tracing acceleration data structure to determine which of the associated volumes (i.e. child nodes) is intersected by the ray. The traversal process then comprises subsequently testing the ray for intersection with the volumes associated with the (child) node in the next level of the ray tracing acceleration data structure, and so on, down to the lowest level (leaf) nodes. Once the traversal process has worked through the ray tracing acceleration data structure, by performing the required ray-volume intersection testing for the nodes to determine which volumes (represented by end/leaf nodes) contain geometry that may be intersected by the ray, the ray can then be further tested to determine the actual (ray-primitive) intersections with the geometry defined within those volumes (and only within those volumes) (with any intersected geometry then being shaded appropriately).

Subject to the requirements of the technology described herein the traversal can be performed in any suitable fashion, as desired.

In an embodiment, the traversal operation traverses the ray tracing acceleration data structure for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection).

Other arrangements would, of course, be possible.

The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore the ray tracing acceleration data structure traversal circuit will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

According to the technology described herein the traversal of the ray tracing acceleration data structure is performed by the programmable execution unit executing a suitable shader program for the ray tracing operation. In particular, and as explained above, in the technology described herein, the traversal operation is performed for a whole group's worth of rays together that are being processed by a corresponding group of execution threads executing the program.

However, rather than the program performing the entire traversal operation, in the technology described herein, an intersection testing circuit is in an embodiment provided that performs the actual intersection testing between the rays and the volumes represented by the nodes of the ray tracing acceleration data structure during the traversal. The ray-volume testing instruction when executed by the execution threads in the execution thread group that is performing the traversal for the group of plural rays, thus in an embodiment causes the graphics processor to message an intersection testing circuit to cause the intersection testing circuit to perform the required testing of one or more of the rays in the group of plural rays, That is, in embodiments, the overall ray tracing operation is performed by a programmable execution unit of the graphics processor executing a graphics processing program to perform the ray tracing operation. However, in embodiments, when the program requires a ray to be tested against a node of the acceleration data structure, as part of the ray tracing operation, the 'ray-volume testing' instruction(s) can be included into the program appropriately, such that when the set of instructions is executed, the execution unit is caused to message the intersection testing circuit and trigger the intersection testing circuit to perform the required intersection testing between the rays and the volumes represented by the nodes of the acceleration data structure.

In this respect, the technology described herein recognises that as part of the ray tracing operation described above there is still a need to perform many intersection tests between rays and the nodes of the acceleration data structure. The technology described herein thus recognises that it may be beneficial to provide a dedicated intersection testing circuit for this purpose that can be called using an appropriate set of one or more 'ray-volume testing' instructions that can be included into the program that is being executed by the graphics processor.

In other words, rather than, e.g., the programmable execution unit performing the full ray tracing ray intersection determination operation, including traversing an acceleration data structure to determine geometry that could be intersected by a ray and then determining whether any geometry is actually intersected by the ray, the programmable execution unit offloads some of that processing, and in particular (and at least) the intersection testing between the rays and the volumes represented by the nodes of the ray tracing acceleration data structure to the intersection testing circuit.

This then has the effect of performing some of the ray tracing operation (namely the ray-volume intersection testing operations) using a circuit (hardware) that is dedicated for that purpose (rather than, e.g., performing that operation using more general programmable processing circuitry that is programmed to perform the required operation). This can then lead to accelerated and more efficient intersection testing, as compared, for example, to arrangements in which that is done by executing appropriate programs using a programmable processing circuit (which may be relatively inefficient, e.g. due to poor memory access locality for execution threads corresponding to different rays).

The use of a dedicated instruction that can be included into the program according to the technology described herein may thus facilitate the use of such intersection testing circuit (hardware). For instance, as explained above, the instruction can be suitably incorporated into the shader program to cause the graphics processor to message the intersection testing circuit as required to perform ray-volume intersection testing for multiple rays in the group of plural rays in one testing instance. Likewise, grouping rays together for the traversal operation in the manner of the technology described herein means that the intersection testing circuit can load all of the relevant input data for the multiple rays to be tested in one go, thus saving memory bandwidth, as explained above.

The technology described herein therefore particularly facilitates the use of a dedicated circuit (hardware) in this way, to provide an overall, improved (more efficient) traversal operation.

The intersection testing circuit of the graphics processor should be, and is in an embodiment, a (substantially) fixed-function hardware unit (circuit) that is configured to perform the intersection testing according to the technology described herein. The intersection testing circuit should thus comprise an appropriate fixed function circuit or circuits to perform the required operations, although it may comprise and have some limited form of configurability, in use, e.g. if desired.

There may be a single or plural intersection testing circuits, e.g. such that plural programmable execution units share a given (or a single) intersection testing circuit, and/or such that a given programmable execution unit has access to and can communicate with and use plural different intersection testing circuits. Where there are plural intersection testing circuits, each such circuit can in an embodiment operate in the manner of the technology described herein.

The intersection testing circuit (or circuits) should also, and in an embodiment does, have a suitable messaging interface for communicating with the programmable execution unit of the graphics processor as required.

Thus, in the technology described herein, during the ray tracing operation, when the traversal operation requires a ray-volume testing intersection operation to be performed for one or more rays in the group of plural rays that are performing the traversal together, the programmable execution unit in an embodiment triggers an intersection testing circuit to perform the desired (ray-volume) intersection testing for the rays in question.

As well as the intersection testing circuit, there may also be other accelerators (special purpose units) that are able to communicate with the programmable execution unit, such as a load/store unit (circuit), an arithmetic unit or units (circuit (s)), a texture mapper, etc., if desired.

The communication between the intersection testing circuit(s), etc., and the programmable execution unit can be facilitated as desired. There is in an embodiment an appropriate communication (messaging) network for passing messages between the various units. This communication (messaging) network can operate according to any desired communications protocol and standard, such as using a suitable interconnect/messaging protocol.

When the programmable execution unit requires the intersection testing circuit to perform intersection testing against a given (non-leaf) node of the ray tracing acceleration data structure for one or more rays in the group of plural rays for which the traversal operation is being performed, the programmable execution unit in an embodiment therefore sends a message to that effect to the intersection testing circuit.

The message that is sent from the programmable execution unit to the intersection testing circuit should, and in an embodiment does, contain information that is required to perform the relevant intersection testing operation. Thus it in an embodiment indicates one or more of, and in an embodiment all of the inputs for the ray-volume intersection testing, e.g. as described below.

At least in the case where the graphics processor includes plural programmable execution units, the message in an embodiment also indicates the sender of the message (i.e. which programmable execution unit has sent the message), so that the result of the ray-volume intersection testing can be returned to the correct programmable execution unit.

The intersection testing circuit can thus be called to perform intersection testing as desired by the appropriate ray-volume intersection testing instruction (or set of instructions) being included into the program. Thus, in embodiments, when a program is generated for causing a group of plural rays to perform a traversal of the ray tracing acceleration data structure together, in the manner described above, when the traversal requires ray-volume intersection testing to be performed in respect of a node of the ray tracing acceleration data structure, an appropriate set of one or more ray-volume intersection testing instructions can be included into the program that when executed will cause the programmable execution unit to message the intersection testing circuit to cause the intersection testing circuit to perform the required ray-volume intersection testing for the node (and to return the output to the programmable execution unit).

However other arrangements would be possible. For instance, rather than messaging hardware to perform the intersection testing, the instruction could cause shader program to jump to a suitable sub-routine to implement the required ray-volume intersection testing.

The actual intersection testing itself, however this is implemented, can be performed in any suitable fashion, as desired, e.g. in the normal fashion for ray tracing processes.

For instance, in the technology described herein, the inputs that are provided for the ray-volume intersection testing (e.g., and in an embodiment, to the intersection testing circuit, where this is present) may and in an embodiment comprise: a set of one or more rays from the group of plural rays that are performing the traversal (each ray corresponding to a respective execution thread in the execution thread group); and a node of the acceleration data structure that is to be tested for the group of plural rays that are performing the traversal.

Each ray may be, and in an embodiment is, defined in terms of the origin (originating position (e.g. x, y, z coordinates)) for the ray that is to be tested (for which the traversal of the ray tracing acceleration data structure is to be determined); the direction of (a direction vector for) the ray that is to traverse the ray tracing acceleration data structure; and the range (distance) that the ray is to traverse (the (minimum and/or maximum) distance the ray is to traverse into the scene).

The set of one or more rays that are input for testing may in some embodiments be the set of all of the rays in the group of plural rays. That is, in some cases, the whole group of rays is input for testing, and then tested accordingly. However, in other embodiments the set of one or more rays that is input for testing comprises a subset of rays from within the whole group of rays, the subset comprising a subset of rays that are to be tested for the node in question (e.g. since they have been found to potentially intersect one or more volumes associated with the node, e.g. in a previous testing instance). This can be indicated appropriately, e.g. using a suitable bit 'mask' that identifies which rays in the group of plural rays should be tested against the node in question (this will be explained further below).

The node is associated with a set of one or more volumes within the scene. For instance, and in embodiments, each (non-leaf, or 'internal') node of the ray tracing acceleration data structure may be, and in embodiments is, associated with a set of plural child node volumes. The associated volumes are thus also obtained as input for the ray-volume intersection testing. These may be obtained in any suitable fashion. For instance, the node volumes may be stored, e.g. in memory, such that they can be loaded in as required when a ray-volume intersection testing instruction is executed in respect of a given node.

The node volume data for a (non-leaf/internal) node (the child node volumes associated with the node) may be stored, e.g. in memory, in any suitable and desired manner.

For example, each child node volume generally corresponds to a three-dimensional cuboid (e.g. cube) within the scene. The position (and size) of the child node volume can thus be defined with reference to its eight vertices. A (each) vertex may be defined in terms of a set of x, y, z co-ordinates defining the position of the vertex (either in terms of its 'absolute' position within the scene, or in some embodiments relative to another position, e.g. a position of a parent node vertex, as will be explained further below). Thus, a child node volume could be defined in terms of a set of eight three-dimensional co-ordinates (so 24 co-ordinate values in total).

In embodiments, however, rather than storing co-ordinates for each of the (eight) vertices that define the volume, the child node volumes are instead defined in terms of a suitable set, e.g. pair, of reduced vertices such as, for example, the bottom left ('minimum') and top right ('maximum') vertices of the volume, and it is only the co-ordinate values for these (two) vertices that are stored for a respective child node. It will be appreciated that storing the opposite corners is enough information to define the entire volume, as this will include the maximum and minimum values along each of the x, y, z axes. Thus, in embodiments, each child node volume is defined in terms of a suitable pair of vertices, with a corresponding set of three-dimensional (x, y, z) co-ordinates stored for each of these vertices (and only these two vertices). This provides a benefit compared to storing the full set of vertices for the volume.

In that case, the sets of co-ordinates defining the two vertices for a child node volume (i.e. the minimum and maximum values along each of the three axes) could simply be stored in full, e.g. in 32-bit floating point format. In that case, 4 bytes of data would be needed to store each co-ordinate, so the three co-ordinates for the two vertices would be stored in total using 24 bytes of data.

In embodiments, however, the child node volume data is stored in an encoded (e.g. compressed) manner, e.g., and in an embodiment, to facilitate more efficient memory access. In other words, the technology described herein recognises that there is scope for improvements in how such node data is stored.

For example, to maximise memory access efficiency, data from external (e.g. main) memory is typically (and in an embodiment) accessed in "bursts", with the graphics processor in an embodiment being configured to read in a certain amount of data (a "block") in a single memory transaction (burst). This memory access unit size (block size) is in an embodiment common to all elements of the graphics processor. For example, where a cache system is used to transfer data from external memory to the graphics processor, the cache is in an embodiment arranged, and the cache lines are in an embodiment sized, in order to facilitate fetching blocks of data in this manner. Thus, a single "block" of data may be stored in a set of one or more (integer) cache lines.

In embodiments, the child node volume data for a given (non-leaf/internal) node is thus in an embodiment stored in such a manner to facilitate more efficient memory access. For example, as mentioned above, each (non-leaf/internal) node of the ray tracing acceleration data structure is in an embodiment associated with, and stores respective volumes for, a plurality of (e.g., and in an embodiment, six) child nodes. In an embodiment, the child node data for a given (non-leaf/internal) node is stored in such a manner to facilitate accessing more, e.g., and in an embodiment, all, of the child node volumes associated with the node in a single memory transaction.

That is, in embodiments, all of the child node volume data for a respective node is stored in a single "block" of data having a size corresponding to the amount of data that can be accessed in a single memory transaction. Thus, where a cache system is used, all of the child node volume data for a respective node is in an embodiment stored in a single cache line (or at least a set of cache lines that can be accessed in a single memory transaction).

In this respect, the technology described herein recognises that being able to store more (e.g. all) of the child node volume data associated with a given node in a single block, such that the data can be obtained in a single memory transaction, can improve the overall efficiency of performing the ray tracing traversal operation that uses the ray tracing acceleration data structure. For example, when a ray (or group of rays) is to be tested for intersection against a set of child node volumes associated with a (non-leaf/internal) node, the graphics processor is able to obtain a plurality of (e.g. and in an embodiment all of) the child node volumes associated with the node that is to be tested in a single memory transaction. This therefore reduces the number of memory transactions and speeds up the fetching of the required child node data (the child node volumes).

To facilitate compressing the child node volume data, in an embodiment, the vertices for the child node volumes are suitably encoded as differences relative to one of the vertices for the parent node volume encompassing the child node volumes. Thus, rather than storing the co-ordinates for the child node volume vertices in a full format that defines the absolute position of the child node volume within the scene, the vertex co-ordinates are in an embodiment instead stored as differences relative to an 'origin' co-ordinate corresponding to one of the vertices defined for the parent node volume.

In an embodiment, the child node vertices are stored as differences relative to the bottom left (minimum) vertex of the associated parent node volume. Other arrangements would however in principle be possible.

Thus, in embodiments, each vertex co-ordinate for a child node volume is stored as a difference value relative to the origin co-ordinate. This therefore reduces the dynamic range of co-ordinates that needs to be stored since the child node volume co-ordinates can only vary within the dimensions of the parent node volume. This can therefore reduce the amount of data required to store each child node vertex since only need to signal a reduced co-ordinate range. For example, rather than storing the vertices in a full, e.g. 32-bit floating point format, the values that are stored in respect of each of the child node vertices can be heavily quantised. For instance, in embodiments, as will be explained further below, an 8-bit integer value may be stored for each vertex.

To further reduce the amount of data required to store the child node volumes, rather than storing the difference values for the child node vertices in full, in an embodiment a 'base' value is stored for each of the child node vertex co-ordinates that can be modified (e.g. scaled) using an appropriate modifier to determine the actual value. This, in embodiments, a set of modifier values are also stored in the same data structure as the base values, which modifier values can be suitably applied to the respective co-ordinate base values for each of the child node vertices and used to determine the child node volume co-ordinates (e.g. relative to the origin position) accordingly. Thus, in an embodiment, for each child node vertex that is being stored, the co-ordinates are encoded using a set of one or more modifier values that are stored for the (non-leaf) node as a whole.

The modifier values may in general take any suitable form as desired. For example, in embodiments the modifier values may comprise offsets that are to be applied to the respective co-ordinate base values for each of the child node vertices. In an embodiment, however, the modifier values comprise scaling factors that are to be applied to the 'base' values stored for each of the child node vertex co-ordinates in order to determine the actual co-ordinates defining the child node that are to be used for the ray tracing process. Thus, applying the modifier values in an embodiment comprises multiplying the base value for the child node vertex co-ordinate by the appropriate modifier value (i.e. scaling factor). In that respect, note that a respective modifier value (scaling factor) may be, and in embodiments is, stored for each axis (such that there are three modifier values for the respective x, y, z axes). Various other arrangements would however be possible.

Thus, in embodiments, for each child node vertex co-ordinate that is being stored, a unique base co-ordinate value is stored. The unique base co-ordinate value is determined such that the true co-ordinate value (e.g. relative to the origin position) can be determined by applying the respective modifier value to the base co-ordinate value. For instance, the modifier values can be (and in embodiments are) determined by appropriately dividing the parent node volume into child node volumes such that there is a continuous set of child node volumes defined within the parent node volume. The step size for the child node volume boundaries is thus effectively determined by the set of modifier values (which as mentioned above are determined based on the size of the parent node volume to divide the parent node volume into suitable child node volumes). Once a set of suitable modifiers are determined, the co-ordinate values can then be encoded appropriately, e.g. by applying the inverse modification to the true value (e.g. by dividing the difference by a scaling factor) to determine the base values that are stored and to which the modifiers should be applied to determine the true values when needed.

In this respect, it will be appreciated that the exact sizes of the child node volumes are essentially arbitrary so long as they fully cover the parent node volume to allow the ray tracing operation to be performed. For example, it is always acceptable to test a ray (or group of rays) against a larger child node volume than necessary when determining whether or not the child node volume may contain geometry, since this will be resolved during the final ray-primitive intersection testing for the leaf node at the end of the traversal of that branch.

This encoding of the co-ordinate values in turn allows further opportunities for reducing the amount of data that is stored since the base co-ordinate values can be heavily quantised, so long as the result of the quantisation is performed conservatively such that the resulting child node volumes become larger. For instance, rather than storing a full (e.g.) 32-bit floating point co-ordinate, the co-ordinated is effectively converted to an offset from the parent co-ordinate, which offset is in turn stored as (e.g.) an 8-bit integer value that is modified (e.g. scaled) by the modifier value to determine the full co-ordinate. Encoding the vertex co-ordinates in this way can thus significantly reduce the amount of data required to store a child node volume.

Thus, in embodiments, the child node volume data stored for a (non-leaf) node comprises a set of one or more (e.g. three) modifier values and, for each child node for which a child node volume is being stored, a unique set of base co-ordinate values. In order to determine the child node volumes, the appropriate modifier values are thus applied to the set of base co-ordinate values to give a suitable set of scaled child node volume co-ordinates.

In an embodiment, the scaled child node volume co-ordinates defines the position of the child node volume relative to an origin co-ordinate value, e.g., and in embodiments, corresponding to one of the parent vertices, for example the minimum (bottom left) vertex. In embodiments, therefore, the origin co-ordinate value is also stored as part of the same data structure, e.g., and in an embodiment, that can be stored and accessed as a single memory block.

The effect of all this is to further reduce the amount of data required to be stored for defining the child node volumes.

For example, a typical graphics processing system may be configured to access memory blocks having a size of 64 bytes. Thus, the memory system is configured to access data in 64-byte blocks, and this is also in embodiments the size of a single cache line, and so on.

Considering an example of a child node volume that is expressed using two vertices, but with each of the vertices' co-ordinates defined in a 32-bit floating point format, in that case, each vertex requires 12 bytes of data to be stored, and each child node volume therefore requires 24 bytes of data. Thus, a typical 64-byte cache line would only be able to store two child node volumes. In cases where the node may be associated with up to six child nodes, that means that up to three separate memory transactions would be required to fetch all of the child node data.

On the other hand, by storing the child node data in an encoded form, e.g. in the manner of the embodiments described above, it is possible to reduce the amount of data that is required to be stored for each vertex, and thereby reduce the overall amount of data stored for the node. For example, the base co-ordinate values for each vertex can in an embodiment be stored using (only) 3 bytes of data (e.g. 8 bits for each of the x, y, z base co-ordinate values). Thus, 6 bytes of data are used for storing the base co-ordinate values for the two vertices defining the child node volume. The three modifier values can in an embodiment each be stored as 8-bit unsigned values, but these modifier values are only stored once (and applied to all of the child nodes for which data is being stored). Thus, storing the modifier values adds only another 3 bytes of data.

In this case, it is therefore possible to store the vertices for defining up to six child node volumes using 39 bytes of data. The node vertex data can therefore easily fit within a 64 byte cache line (together with any other child node metadata, e.g. an indication of the child node type, that may also need to be stored with the child node volumes). This is therefore a significant improvement compared to other possible approaches, e.g. compared to storing the child node volumes in full.

It will be appreciated that the numbers given above are only presented by way of example and other arrangements would be possible, e.g. depending on the memory access size and the desired level of precision. Overall, however, it will be appreciated that the embodiments described above facilitate a more efficient storage of the child node volume data.

Thus, in embodiments, obtaining the child volumes associated with a parent node for input to the ray-volume intersection testing comprises: obtaining a set of node volume data indicative of respective volumes of child nodes associated with the parent node, the node volume data comprising, for each child node for which volume data is stored, a respective set of base co-ordinate values, and the node volume data further comprising a set of one or more modifier values (e.g. scaling factors) that are to be applied to the respective base co-ordinate values for the child nodes in order to determine an associated volume for the child node.

When the child node volumes are subsequently required, e.g. as part of the ray-volume intersection testing described above, the method in an embodiment further comprises: for each child node, applying the set of one or more modifier values to the respective base co-ordinate values for the child node to determine a set of modified co-ordinate values usable to determine an associated volume for the child node.

It is believed that storing such node data in this way may be novel and inventive in its own right.

Accordingly, a further embodiment of the technology described herein comprises a method of accessing node volume data for use by a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, and wherein the plurality of nodes includes at least one parent (i.e. internal or non-leaf) node that is associated with a respective set of plural child nodes, with the parent node volume encompassing the volumes of its respective child nodes, the ray tracing process comprising testing rays for intersection with the volumes represented by the nodes of the acceleration data structure to determine geometry for the scene to be rendered that may be intersected by the rays; the method comprising: obtaining for a parent node to be tested a set of node volume data indicative of respective volumes of child nodes associated with the parent node, the node volume data comprising, for each child node for which volume data is stored, a respective set of base co-ordinate values, and the node volume data further comprising a set of one or more modifier values that are to be applied to the respective base co-ordinate values for the child nodes in order to determine an associated volume for the child node.

A further embodiment of the technology described herein comprises a graphics processor that is operable to render a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, and wherein the plurality of nodes includes at least one parent (i.e. internal or non-leaf) node that is associated with a respective set of plural child nodes, with the parent node volume encompassing the volumes of its respective child nodes, the ray tracing process comprising testing rays for intersection with the volumes represented by the nodes of the acceleration data structure to determine geometry for the scene to be rendered that may be intersected by the rays; the graphics processor comprising: a memory interface circuit that is configured to obtain, from external (e.g. main) memory, for a parent node to be tested a set of node volume data indicative of respective volumes of child nodes associated with the parent node, the node volume data comprising, for each child node for which volume data is stored, a respective set of base co-ordinate values, and the node volume data further comprising a set of one or more modifier values that are to be applied to the respective base co-ordinate values for the child nodes in order to determine an associated volume for the child node.

In an embodiment, the method further comprises: for each child node, applying the set of one or more modifier values to the respective base co-ordinate values for the child node to determine a set of modified co-ordinate values usable to determine an associated volume for the child node. That is, once the node volume data is obtained, it is in an embodiment then used to determine the associated volume for the child node (which volume can be (and is) in turn used for the ray-volume intersection testing).

As mentioned above, in embodiments, the node volume data further comprises an origin co-ordinate relative to which the child node volume is defined. For example, the origin co-ordinate may be a co-ordinate of a vertex the parent node volume, e.g., and in an embodiment, the co-ordinate of the minimum (bottom left) vertex of the parent node volume.

In that case, the associated volume for a child node is determined by adding the set of modified co-ordinate values generated by applying the modifier values to the base co-ordinate values for the child node to the origin co-ordinate to define the child node volumes within the scene.

Various other arrangements would of course be possible.

In embodiments, the node volume data may also comprise any other information, e.g. child node metadata, that may be required to be stored for the ray tracing process. For example, this may include at least indications of child node 'type', i.e. whether the child node is an 'internal' (non-leaf) node or whether the child node is, for example, an end (leaf) node containing primitives, or a node that is not used.

As mentioned above, a given parent (non-leaf/internal) node may in an embodiment be associated with up to six respective child nodes. In embodiments, the node volume data stores encoded volume data for each of the (six) child nodes associated with the parent node.

If desired, padding may be performed to align the node volume data to the size of a memory access block.

As will be appreciated by those skilled in the art, these additional embodiments of the technology described herein relating to the storing of the node data can, and in an embodiment does, include any one or more or all of the features of the other aspects technology described herein described herein, as appropriate.

Thus, for example, once the co-ordinates for a child node volume has been determined, the child node volume can be provided as input to the ray-volume intersection testing accordingly, and used to determine whether or not that child node potentially contains geometry, and in turn to control how the traversal operation proceeds. The benefit of these additional embodiments is therefore that the child node volume data that needs to be tested against a given ray (or group of rays) can be accessed more efficiently, using fewer memory transactions, which can in turn speed up the overall traversal operation. The ray-volume intersection testing itself can then be performed by testing each of the rays in the input set of one or more rays against the one or more volumes associated with the node. This can be done in any suitable manner, as desired, e.g. in the normal way for ray tracing operations.

In embodiments a plurality of rays are tested against a plurality of child volumes associated with a node. This is in an embodiment done in an iterative manner, e.g. by testing a first ray in the group against each of the child volumes in turn, and then moving on to the second ray, and so on, until all of the rays in the group that need to be tested have been tested against all of the child volumes. Various arrangements would be possible in this regard.

In some embodiments the node volumes may be stored, e.g. in memory, in a compressed format. In that case, it may be beneficial to perform the intersection testing at a corresponding, lower resolution. In this respect it will be appreciated that there is no harm in performing the ray-volume testing more conservatively (at a lower resolution) during the traversal operation, as the actual ray-primitive intersections will be determined in a subsequent step, e.g. once the traversal is complete and it has been determined which geometry may be intersected.

Once the required intersection testing in respect of a node has completed, the result of the ray-volume intersection testing for the node is then returned as output. The outputted result can then be used by the program that is performing the traversal, e.g. to determine which nodes of the ray tracing acceleration data structure to test next. For example, if it is determined that a particular set of child nodes of the node being tested are potentially intersected by a ray, the outputted result should indicate that set of child nodes, to cause the traversal program to trigger ray-volume intersection testing with those nodes, and so on.

A suitable traversal record is thus in an embodiment maintained to track and manage which nodes should be tested during the traversal operation. The traversal record thus in an embodiment includes as entries indications of which nodes of the ray tracing acceleration data structure should be tested (i.e. which nodes have volumes for which it has been determined that are intersected by a ray in the group of plural rays performing the traversal operation).

The traversal record may generally take any suitable form, e.g. as may suitable be used for managing such ray tracing traversal operations, but in an embodiment comprises a traversal 'stack', as mentioned above.

Thus, during the traversal operation, when (and whenever) it is determined by an instance of ray-volume testing that a (child) node represents a subset of geometry that may be intersected by a ray in the group of plural rays performing the traversal operation, an indication of, e.g. pointer to, the node is then included into (e.g. pushed to) the traversal record so that the entry can subsequently be read out (popped) from the traversal record by the shader program to cause the rays to be tested against that node, accordingly, and so on.

The traversal record can then be worked through with the record entries being read out (popped) accordingly and provided to the shader program to determine which nodes to be next tested. In the case of a traversal stack, this is in an embodiment managed using a 'last-in-first-out' scheme with the node intersections being pushed to/popped from the stack appropriately. However, various arrangements would be possible in that respect.

Thus, the ray-volume intersection testing in an embodiment determines which (child) nodes are potentially intersected by a ray, and for each child node that is determined to be intersected by a ray, a pointer to that child node is pushed to the traversal record. The record is then worked through as the traversal program is executed to cause those nodes to be tested. The output of the ray-volume testing is thus in an embodiment returned in the form of an updated state of the traversal record, e.g. indicating which (child) nodes are hit and need to be tested at the next level, and so on.

The result of the ray-volume intersection testing thus in an embodiment comprises a set of one or more nodes (e.g. child nodes of the node being tested) that were determined from the ray-volume intersection testing as being intersected by at least one of the rays that were tested. In that case, the current state of the traversal record (which is in an embodiment shared between all execution threads in the execution thread group) is in an embodiment also provided as input for the ray-volume intersection testing, together with the information identifying the node and rays to be tested. The updated state of the traversal record is in an embodiment then being returned as output.

The traversal record is thus a list of which nodes are intersected, and therefore contain geometry that may be intersected, and the traversal operation is performed by working through the stack entries until the potential intersections with the volumes of the lower level nodes have been determined.

In the technology described herein the traversal operation is performed for a group of plural rays together. This means that the traversal record can be and in an embodiment is managed for the group of plural rays as a whole (in an embodiment using a set of shared, common registers for the corresponding plurality of execution threads processing the rays in the group of rays). This means that there is no need to load/store individual traversal records for each ray.

This is because the traversal record is in an embodiment shared by a plurality of rays, it is in an embodiment also tracked which rays in the group of plural rays need to be tested for which nodes.

For instance, the ray-volume intersection testing could simply be performed for all of the rays in the group for each node that is to be tested (in that case whenever any of the rays in the group of plural rays are found to intersect the volume associated with a particular (child) node, all of the rays in the group of plural rays may then be tested against that node, regardless of which of the rays were actually determined to intersect the volume). However, this may be relatively inefficient.

Thus, in embodiments, the result of the intersection testing comprises an indication of a node that needs to subsequently be tested (e.g. because it's associated volume was intersected by the rays that were tested, as described above), together with an indication of which of the rays that were tested were determined to intersect the volume associated with the node, and should therefore be tested against the node when the traversal program reaches that node.

This indication is in an embodiment provided in the form of a bit 'mask' indicating which rays should be tested, and which bit mask is in an embodiment also pushed to the traversal stack as a result of the intersection testing. That is, the ray-volume intersection testing in an embodiment determines which rays intersect which (child) volumes associated with the node being tested, and an indication of which rays have been found to intersect which volumes, e.g. in the form of the bit mask associated with each node that is determined as being intersected by a ray, is returned as a result of the intersection testing.

Thus, when a node is popped from the traversal record (e.g. stack) for ray-volume intersection testing, before performing the ray-volume intersection testing, the active mask can be (and in an embodiment is) read to determine which of the rays in the group of plural rays need to be tested against that node, and in an embodiment only those rays are tested.

Thus, when loading the instruction for testing against a given node, it is in an embodiment first determined using the bit mask which rays in the group of rays performing the traversal operation together should be tested against the node. The desired ray-volume intersection testing can then be performed for the node for those rays (and only those rays), and so on, to determine which geometry is potentially intersected by which rays.

In an embodiment, the traversal record is managed using a set of common registers shared by the execution threads in the group of plural execution threads that are processing the group of plural rays performing the traversal operation. The record is thus the current traversal record loaded into all lanes of one general purpose register. The registers may be configured in any suitable fashion, as desired.

For instance, when executing an instruction in a program, the execution unit (e.g. the appropriate functional unit, such as an arithmetic unit, of the execution unit) will typically read one or more input data values (operands), perform a processing operation using those input data values to generate an output data value, and then return the output data value, e.g. for further processing by subsequent instructions in the program being executed and/or for output (for use otherwise than during execution of the program being executed).

The input data values to be used when executing the instruction will typically be stored "locally" in an appropriate set of registers (a register file) of and/or accessible to the execution (functional) unit, and the output data value(s) generated by the execution (functional) unit when executing the instruction will correspondingly be written back to that storage (register file).

To facilitate this operation, each execution thread, when executing a shader program, will correspondingly be allocated a set of one or more registers for use by that thread when executing the shader program.

Thus when executing an instruction, an execution thread will read input data values (operands) from a register or registers of a set of one or more registers allocated to that thread, and write its output value(s) back to a register or registers of the thread's register allocation.

The data will be loaded into the registers, and written out from the registers, from and to an appropriate memory system of or accessible to the graphics processor (e.g. via an appropriate cache system (cache hierarchy)).

Thus, as well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

That is, the execution thread group as a whole is in an embodiment also allocated one or more shared, e.g. general purpose, registers, and it is these common registers that are in an embodiment used to manage the traversal record in the technology described herein.

Where there are plural execution units, each execution unit may have its own distinct group of registers (register file). There may also be (and in an embodiment is) a single group of registers (register file) shared between plural (e.g. in an embodiment all) of the separate execution units.

Thus, the result of the ray-volume intersection testing is in an embodiment pushed to the traversal record that is stored using the shared registers. Likewise the traversal record entries are in an embodiment popped from the shared registers. The required push/pop operations for managing the traversal record are in an embodiment implemented, e.g., by performing suitable register shifts.

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The traversal program will thus traverse the nodes of the ray tracing acceleration data structure, performing the required ray-volume intersection testing for the nodes at each level of the ray tracing acceleration data structure accordingly to determine with reference to the end (leaf) nodes of the ray tracing acceleration data structure which geometry (if any) may be intersected by the rays in the group of plural rays for which the traversal operation is being performed.

Thus, the ray-volume intersection testing described above is in an embodiment performed, as required, in respect of plural nodes across multiple levels of the ray tracing acceleration data structure, e.g. down to the level of the end (leaf) nodes representing the subsets of geometry defined for the scene.

The end result of this is thus an indication of which geometry (if any) may be intersected by the rays in the group of plural rays. In an embodiment this indication also indicates which of the rays potentially intersect which subsets of geometry (e.g. in the form of a bit mask, as explained above).

In the case that the ray was found to intersect a volume of the scene that contains geometry defined for the scene (thus the traversal operation found that there is geometry defined for the scene that the ray potentially intersects), the result (the indication of geometry for the scene to be rendered that may be intersected by the ray) that is returned to the programmable execution unit should, and in an embodiment does, comprise an indication of the defined geometry in the volume or volumes determined to be intersected by the ray. Thus, in the case where a ray is found to intersect a volume that contains defined geometry, then the ray tracing acceleration data structure traversal operation should, and in an embodiment does, return to the programmable execution unit an indication of the geometry for the volume in question.

In this case, the indication of geometry for the scene to be rendered that may be intersected by the ray in question can indicate the geometry that could be intersected for the ray in any suitable and desired manner, e.g., and in an embodiment, in dependence upon the format of the ray tracing acceleration data structure that has been traversed. Thus, this could be in the form of a set of one or more primitives (e.g. points, lines or polygons, such as triangles, etc., and/or spheres, cylinders, cones, etc.) that could be intersected by the ray, and/or some form of higher level definition and/or description of geometry that could be intersected by the ray, for example in the form of more general or generic references to geometry, such as higher order representations of geometry for the scene.

The information that is provided for the (potentially) intersected geometry can take any suitable and desired form, e.g., and in an embodiment, in dependence upon the form of the geometry itself. For example, in the case of a set of primitives (as candidates for intersection), the appropriate primitive identifiers and any associated geometry identifier (e.g. to which they belong) could be returned.

The Applicants have recognised that it would also be possible for the traversal for a ray to fail to find any geometry defined for the scene that the ray could potentially intersect, e.g. in the case when none of the volume of the scene that the ray passes through contains any defined geometry for the scene.

In the case that the ray tracing acceleration data structure traversal finds that the ray does not traverse any volume that contains defined geometry for the scene, then the graphics processor in an embodiment returns an appropriate response in that event. In an embodiment, the ray tracing acceleration data structure traversal returns a response indicating that nothing has been intersected by the ray (that no potential intersection has been found) (i.e. that there has been a "miss").

In an embodiment, in response to such a "miss" response from the ray tracing acceleration data structure traversal, the programmable execution unit performs an appropriate particular, in an embodiment selected, in an embodiment predefined, "default" operation for further processing for the sampling position in question in response to that event. This could comprise, for example, assuming intersection with a bounding volume or 'skybox' or computing a procedural colour for the background, etc. Various other arrangements would be possible in this regard. The programmable execution unit will then shade the sampling position accordingly.

Thus, in an embodiment, the ray tracing operation acts to (and is configured to) determine whether any of the volumes in the scene represented by the ray tracing acceleration data structure traversed by the ray contain any geometry for the scene, and in the case where the ray does traverse a volume for the scene that contains geometry defined for the scene, returns to the programmable execution unit an indication of the geometry for the volume in question, but where the ray does not traverse any volume that contains geometry defined for the scene, returns to the programmable execution unit an indication of that (a "miss" event).

Thus, in an embodiment, once it has been determined which subsets of geometry may be intersected by a ray (from within a group of plural rays), it is then determined which, if any, of the geometry is actually intersected by the ray(s), e.g. by performing suitable ray-primitive intersection testing, as described above.

The ray-primitive intersection determination can use the information returned by the ray tracing acceleration data structure traversal as appropriate and desired. Thus it will, in an embodiment, use the indication of geometry that may be intersected by the ray to test whether the geometry is actually intersected by the ray, together with any other properties, such as surface properties, indicated for the geometry that may affect intersection of the ray or the operation that is required.

Thus, for each leaf node (subset of geometry) that may be intersected by a ray or rays, it is then determined which geometry is actually intersected by the rays. That is, when the traversal operation to determine which geometry may be intersected by the rays in the group of plural rays determines that a particular subset of geometry (represented by leaf node) may be intersected by a ray or rays, the graphics processor then tests the ray or rays for intersection with the individual units of geometry (primitives) accordingly.

The geometry associated with a given leaf node may be obtained in any suitable and desired manner. In an embodiment, it is obtained from memory. In that case, the geometry (e.g. a set of primitives) associated with the leaf node may be stored in such a manner to facilitate memory access, e.g. such that all of the geometry (primitives) to be tested for a given leaf node can in an embodiment be obtained from external (e.g. main) memory in a single memory transaction (burst). For example, in an embodiment, the number of primitives that are associated with a given leaf node is selected such that all of the primitives stored within a block of memory can be obtained from external (e.g. main) memory in a single memory transaction (burst). For example, where a cache system is used, this block size may correspond to a set of one or more (integer) cache lines. This can therefore facilitate an overall more efficient ray-primitive intersection testing.

This ray-primitive intersection testing can be done in any suitable fashion as desired. For instance, this may be done by the programmable execution unit itself or by suitable intersection testing hardware. Where this is performed in hardware, this may be same or different hardware to the intersection testing circuit that performs the ray-volume intersection testing, where this is provided. For instance, in some embodiments, there may be provided dedicated (hardware) circuits for both the ray-volume and ray-primitive intersection testing.

Likewise the ray-primitive intersection testing may be performed for a group of plural rays (which may be the same group of plural rays for which the traversal operation was performed, but it would also be possible to re-group the rays for the subsequent processing after the initial traversal operation), or may be performed for individual rays.

In whatever manner the ray-primitive intersection testing is performed, the end result of all of this is to determine which geometry (if any) is intersected by which rays.

It should be noted in this regard that while the programmable execution unit will, and in an embodiment does, use the indicated geometry to determine the geometry that is intersected by a ray, as the ray tracing acceleration data structure traversal only returns an indication of geometry that may be intersected by the ray (e.g. that is present in a volume that the ray intersects (pass into/through), it could be that in fact the ray will not actually intersect any of the indicated geometry. Thus while the determination of any geometry that is intersected by a ray performed by the programmable execution unit may, and typically will, result in the identification of geometry that is actually intersected by the ray, it could be the case that the intersection determination will in fact determine that there is in fact no geometry that is intersected by the ray.

In the case that the ray-primitive intersection determination determines that there is in fact no geometry that is intersected by the ray (e.g. when the ray tracing acceleration data structure traversal operation returns a set of primitives, but none of the primitives is actually intersected by the ray), then the programmable execution unit in an embodiment treats that as a ray tracing intersection "miss" (as discussed above for the situation where the ray tracing acceleration data structure traversal does not identify any intersection for a ray), and then performs an appropriate "miss" "default" operation accordingly.

The determination of which geometry is intersected by the rays is then used by graphics processor to continue the processing (ray tracing/rendering) operations.

For instance, the operations described above can then be (and are) repeated for other groups of rays for the sampling position, and once this is done, the sampling position can then be rendered accordingly, e.g. in the usual way for ray tracing operations.

For any geometry (primitives) that is it determined is actually intersected by a ray, various processing steps can then be taken to determine the effect (e.g. appearance) this should have in the sampling position for which the ray was cast.

Thus, once the geometry that the rays will actually intersect (if any) has been determined, then the programmable execution unit performs further processing for the sampling positions in the frame that the rays correspond to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of: triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

In order to perform the ray-primitive intersection testing and any required subsequent processing, the programmable execution unit may, and in an embodiment does, use further information relating to the geometry (e.g. primitives), such as appropriate attributes of the geometry (e.g. primitives), such as their vertex positions, normals, surface type/materials), etc. This may be needed in order to determine the actual intersection (point), and for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit as appropriate, once an intersection determination has been returned by the ray tracing acceleration data structure traversal operation (e.g. by, as discussed below, executing further program instructions to fetch the required attributes).

It would also or instead be possible, if desired, for the indication of the geometry for the scene to be rendered that may be intersected by the ray that is returned to the programmable execution unit by the ray tracing acceleration data structure traversal operation to, as well as indicating the geometry itself, convey and/or indicate such information regarding the properties of the geometry, e.g. in the form of indexes/pointers to data structure(s) where data relating to the properties of the geometry is stored.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal operation returns with the indicated geometry an indication of which one of the different models should be used for the geometry.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

The technology described herein also extends to an overall graphics processing system and the operation of that system.

Thus, another embodiment of the technology described herein comprises a method of operating a graphics processing system, the graphics processing system including: a graphics processor comprising: a programmable execution unit operable to execute programs to perform graphics processing operations, and in which a program can be executed by plural execution threads at the same time; the method comprising: generating a graphics shader program or programs which, when executed by the programmable execution unit of the graphics processor, causes the graphics processor to render a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays; the generating a graphics shader program or programs which, when executed by the programmable execution unit of the graphics processor, causes the graphics processor to render a frame that represents a view of a scene comprising one or more objects using a ray tracing process comprising: including in a program to perform a ray tracing acceleration data structure traversal, wherein the program is to be executed by a group of plural execution threads, each execution thread in the group of execution threads performing a traversal operation for a respective ray in a corresponding group of rays such that the group of rays performs the traversal operation together, a set of one or more ray-volume testing instructions for testing rays for intersection with the one or more volumes associated with a given node of the ray tracing acceleration data structure that is to be tested during the traversal operation, which set of ray-volume testing instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation; the method further comprising: providing the generated graphics shader program or programs to the graphics processor for execution by the programmable execution unit; and the programmable execution unit of the graphics processor: executing the graphics shader program or programs to render a frame that represents a view of a scene comprising one or more objects using a ray tracing process; and when a group of execution threads is executing the program or programs for a corresponding group of rays that are performing a traversal of the ray tracing acceleration data structure together, in response to the execution threads executing the set of one or more ray-volume testing instructions in respect of a node of the ray tracing acceleration data structure: testing one or more rays from the group of plural rays that are performing the traversal operation together for intersection with the one or more volumes associated with the node being tested; and returning a result of the intersection testing for the node for the traversal operation; the method further comprising: for each ray in the group of rays performing the traversal operation together, determining any geometry that is intersected by the ray; and performing further processing for a sampling position in the frame that the ray corresponds to in accordance with any geometry for the scene determined to be intersected by the ray.

Thus, another embodiment of the technology described herein comprises a graphics processing system, the graphics processing system comprising: a graphics processor comprising: a programmable execution unit operable to execute programs to perform graphics processing operations, and in which a program can be executed by plural execution threads at the same time; the graphics processing system further comprising:

a processing circuit configured to: generate a graphics shader program or programs which, when executed by the programmable execution unit of the graphics processor, causes the graphics processor to render a frame that represents a view of a scene comprising one or more objects using a ray tracing process; the generating a graphics shader program or programs which, when executed by the programmable execution unit of the graphics processor, causes the graphics processor to render a frame that represents a view of a scene comprising one or more objects using a ray tracing process comprising: including in a program to perform a ray tracing acceleration data structure traversal, wherein the program is to be executed by a group of plural execution threads, each execution thread in the group of execution threads performing a traversal operation for a respective ray in a corresponding group of rays such that the group of rays performs the traversal operation together, a set of one or more ray-volume testing instructions for testing rays for intersection with the one or more volumes associated with a given node of the ray tracing acceleration data structure that is to be tested during the traversal operation, which set of ray-volume testing instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation; the processing circuit being further configured to: provide the generated graphics shader program or programs to the graphics processor for execution by the programmable execution unit; and the programmable execution unit of the graphics processor being configured to: execute the graphics shader program or programs to render a frame that represents a view of a scene comprising one or more objects using a ray tracing process; and when a group of execution threads is executing the program or programs for a corresponding group of rays that are performing a traversal of the ray tracing acceleration data structure together, in response to the execution threads executing the set of one or more ray-volume testing instructions in respect of a node of the ray tracing acceleration data structure: the execution unit triggers testing of one or more rays from the group of plural rays that are performing the traversal of the ray tracing acceleration data structure together for intersection with the one or more volumes associated with the node being tested, wherein a result of the intersection testing is then returned for the node for the traversal operation; the programmable execution unit of the graphics processor being further configured to: for each ray in the group of rays performing the traversal operation together, determine any geometry that is intersected by the ray; and perform further processing for a sampling position in the frame that the ray corresponds to in accordance with any geometry for the scene determined to be intersected by the ray.

As will be appreciated by those skilled in the art, these embodiments of the technology described herein can, and in an embodiment do, include any one or more or all of the features of the technology described herein described herein.

Thus, for example, the shader program or programs that are provided to the graphics processor for execution (and that are prepared by the compiler) in an embodiment comprise a first sequence of instructions to perform appropriate graphics processing operations for a ray tracing-based rendering process up to and including the traversal operation, together with one or more sequences of instructions to be executed once a response from the traversal operation has been received (and, in an embodiment, to be executed in dependence upon the response from the ray tracing acceleration data structure, such as the geometry/surface type), which sequences of instructions will, when executed, determine any geometry that is intersected by a ray using the determined indication of the geometry returned by the ray tracing acceleration data structure traversal, and then trigger further processing in respect of a sampling position that the ray corresponds to accordingly (which further processing in an embodiment may be the casting of a further ray, and/or the rendering (shading) of the sampling position that the ray corresponds to).

Other arrangements would, of course, be possible.

It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and units of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described by way of example only and with reference to the accompanying drawings.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
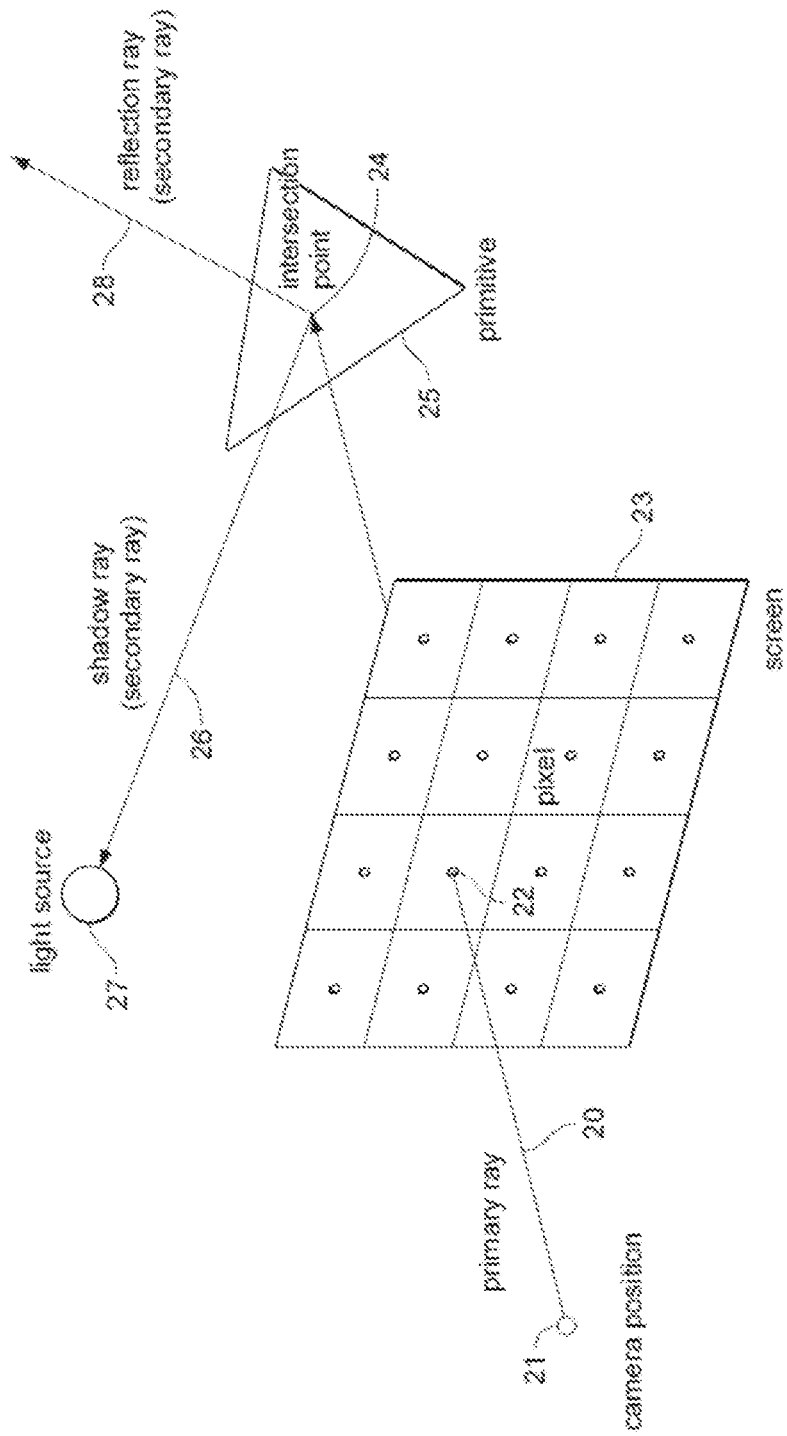
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-)volumes in the overall volume of the scene (that is being considered). In the present embodiments, ray tracing acceleration data structures in the form of Bounding Volume Hierarchy (BVH) trees are used.

Figure 3:
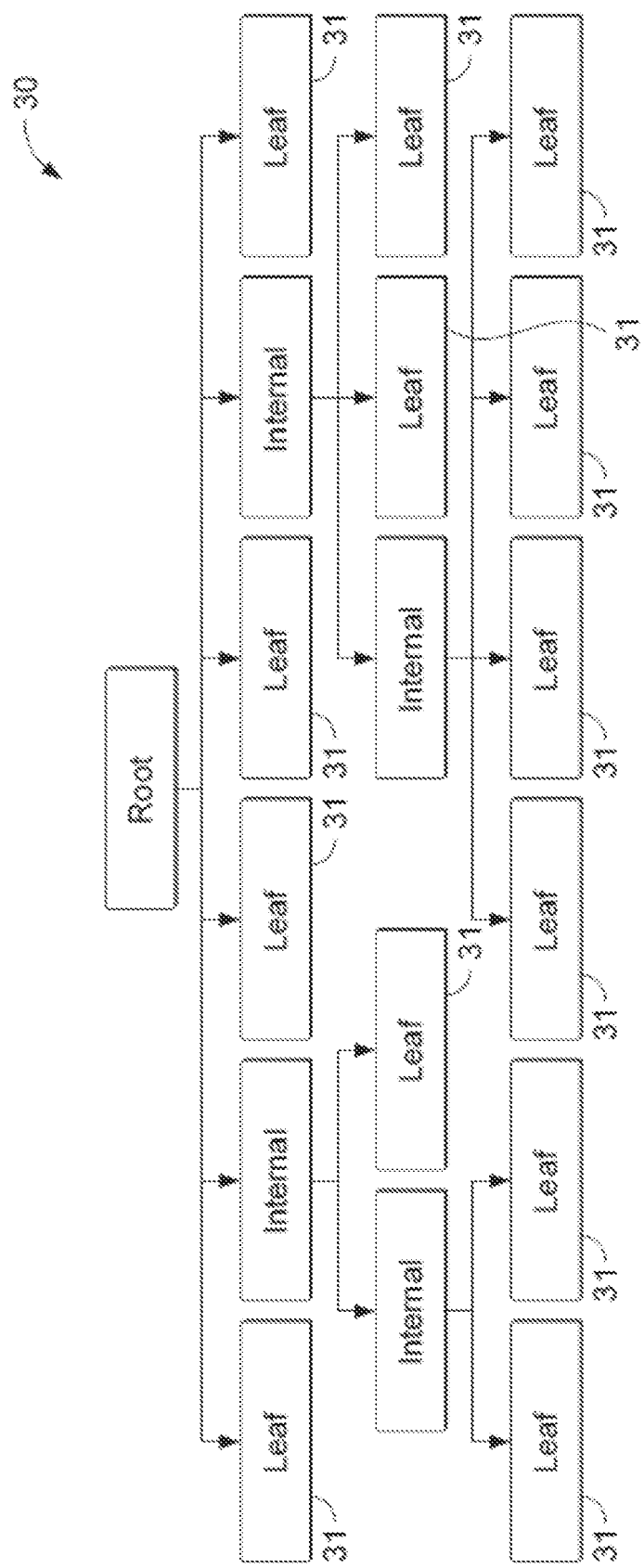
FIG. 3 shows an exemplary ray tracing acceleration data structure.

FIG. 3 shows an exemplary BVH tree 30, constructed by enclosing the complete scene in an axis-aligned bounding volume (AABV), e.g. a cube, and then recursively subdividing the bounding volume into successive sub-AABVs according to any suitable and desired, and, e.g. various, subdivision schemes (e.g. same number of objects per child, based on traversal cost, etc.), until a desired smallest subdivision (volume) is reached.

In this example, the BVH tree 30 is a wide tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume of the scene being rendered associated with it, with the end, leaf nodes 31 each representing a particular smallest subdivided volume of the scene, and any parent node representing, and being associated with, the volume of its child nodes. Each leaf node will also correspondingly be associated with the geometry defined for the scene that falls, at least in part, within the volume that the leaf node corresponds to (e.g. whose centroid falls within the volume in question), with the leaf nodes 31 representing unique (non-overlapping) subsets of primitives defined for the scene falling within the corresponding volumes for the leaf nodes 31. The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Figure 4:
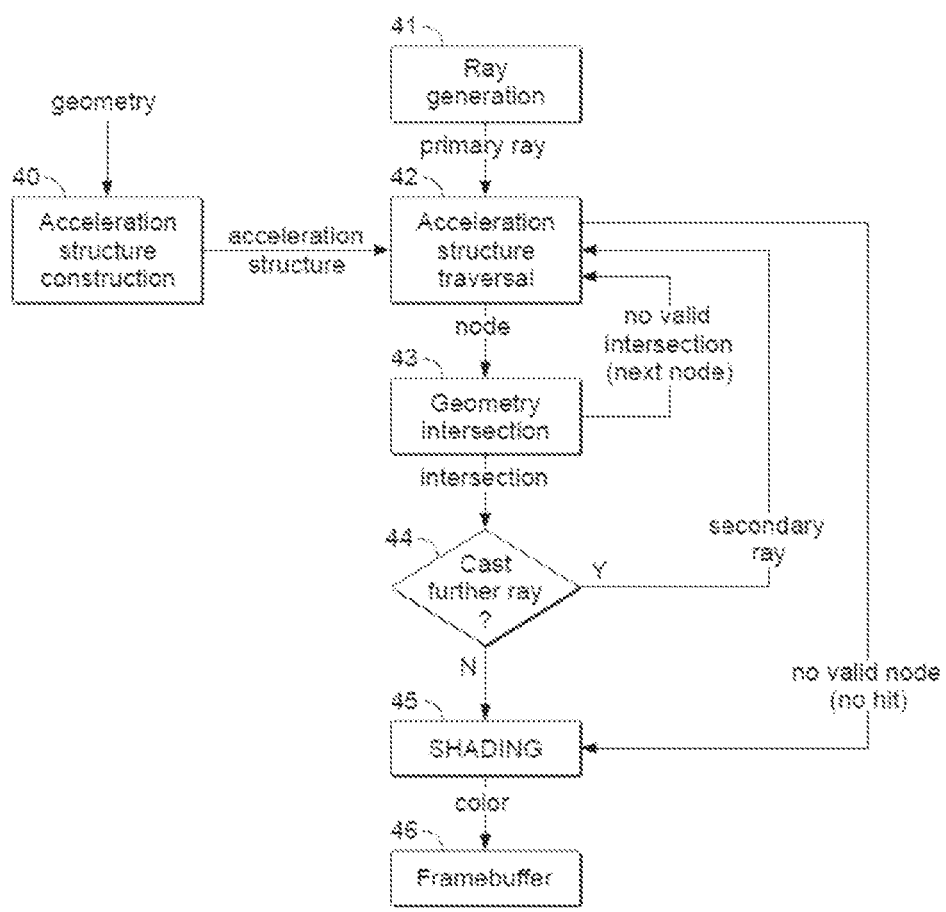
FIG. 4 is a flow chart illustrating an embodiment of a full ray tracing process.

FIG. 4 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
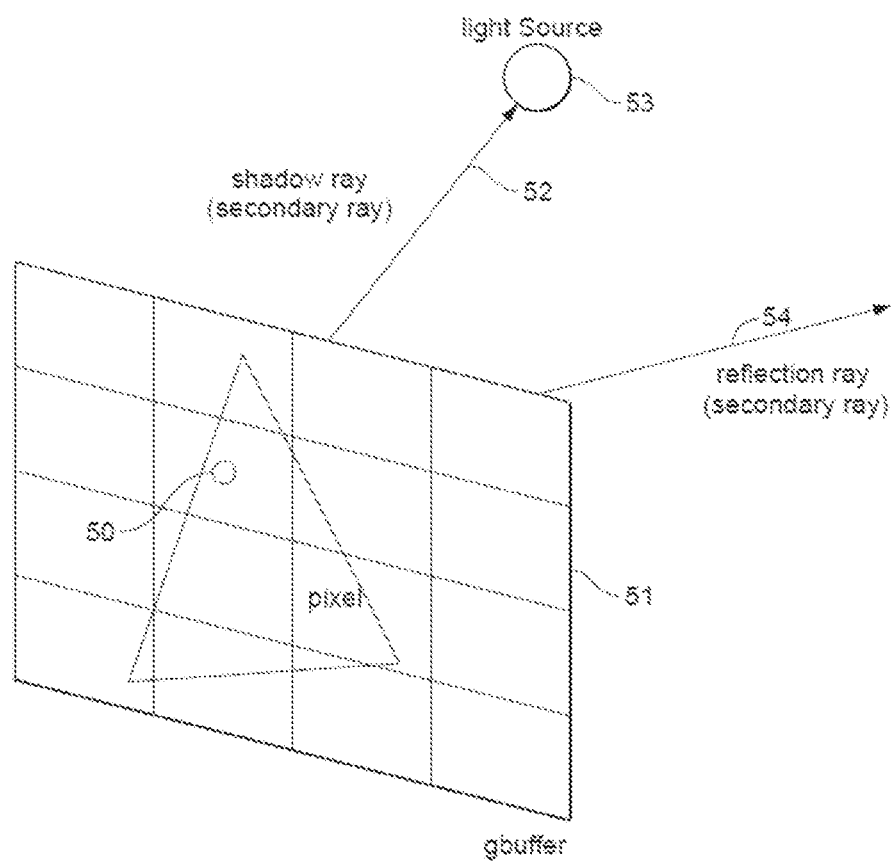
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal and geometry intersection (steps 42-43 in FIG. 4) performed as part of the ray tracing operation.

Figure 6:
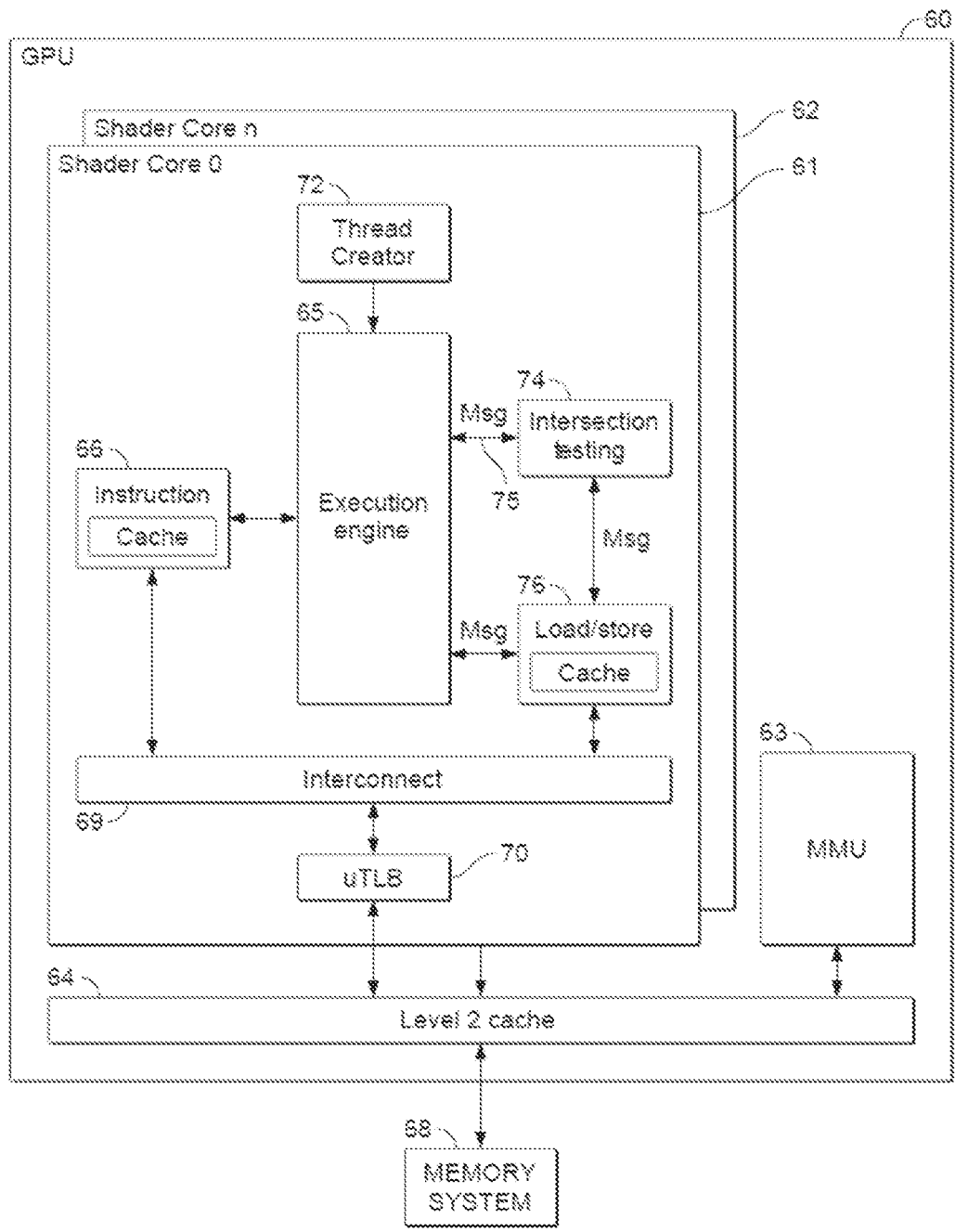
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a thread creator (generator) 72 operable to generate execution threads for execution by the programmable execution unit 65.

As shown in FIG. 6, the shader core 61 also includes an intersection testing circuit 74, which is in communication with the programmable execution unit 65, and which is operable to perform the required ray-volume testing during the ray tracing acceleration data structure traversals (i.e. the operation of step 42 of FIG. 4) for rays being processed as part of a ray tracing-based rendering process, in response to messages 75 received from the programmable execution unit 65.

In the present embodiments the intersection testing circuit 74 is also operable to perform the required ray-primitive testing (i.e. the operation of step 43 of FIG. 4). The intersection testing circuit 74 is also able to communicate with the load/store unit 76 for loading in the required data for such intersection testing.

In the present embodiments, the intersection testing circuit 74 of the graphics processor is a (substantially) fixed-function hardware unit (circuit) that is configured to perform the required ray-volume and ray-primitive intersection testing during a traversal of a ray tracing acceleration data structure to determine geometry for a scene to be rendered that may be (and is) intersected by a ray being used for a ray tracing operation.

Figure 7:
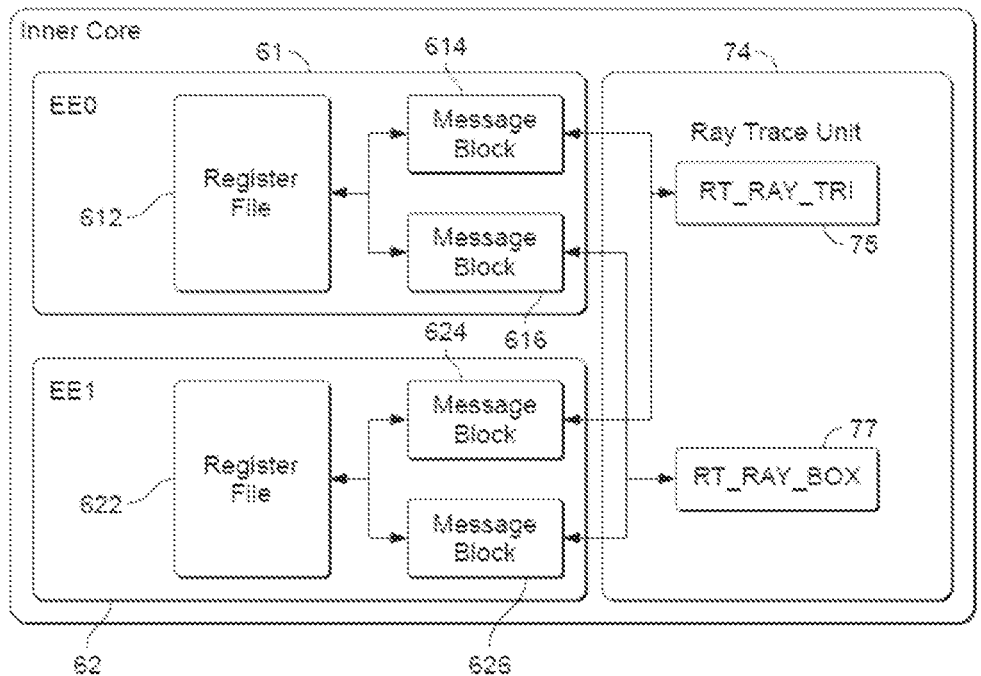
FIG. 7 shows schematically in more detail elements of a graphics processor that can be operated in the manner of the technology described herein.

FIG. 7 shows in more detail the communication between the intersection testing circuit 74 and the shader cores 61, 62. As shown in FIG. 7, in the present embodiments, the intersection testing circuit 74 includes respective hardware circuits for performing the ray-volume testing (RT_RAY_BOX) 77 and for performing the ray-primitive testing (RT-RAY-TRI) 75. The shader cores 61, 62 thus contain appropriate message blocks 614, 616, 624, 626 for messaging the respective ray-volume testing circuit 77 and ray-primitive testing circuit 75 accordingly when it is desired to perform intersection testing during a traversal operation.

As also shown in FIG. 7, these message blocks communicate with respective register files 612, 622 of the shader cores 61, 62 so that the result of the intersection testing can be written to the register files. In particular, in the present embodiments the traversal operation is managed using a traversal stack that is maintained in a set of shared register files for a group of plural execution threads (a warp) processing rays that are performing the traversal operation.

Figure 8:
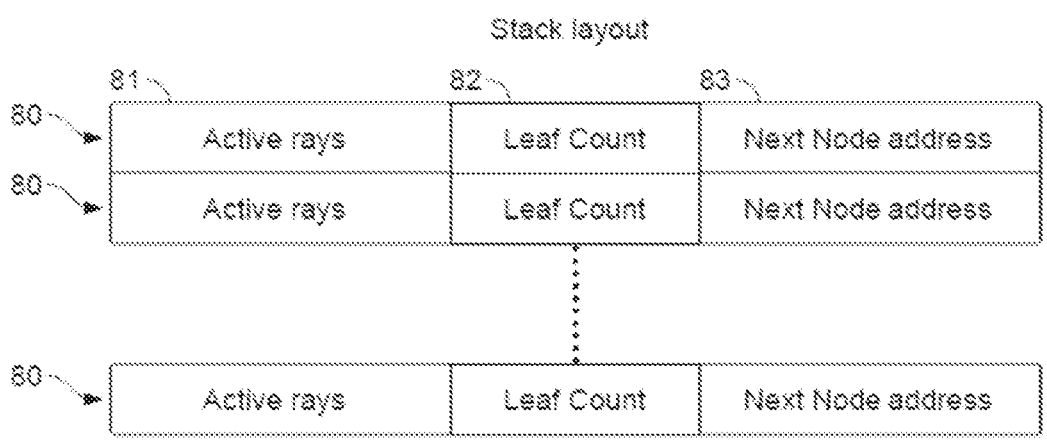
FIG. 8 shows schematically a stack layout that may be used for managing a ray tracing traversal operation.

FIG. 8 shows the stack layout in the present embodiments. As shown in FIG. 8, the traversal stack includes a list of entries 80. Each entry is associated with an indication of the next node address to be tested, e.g. in the form of a suitable pointer to the next node address 83. The leaf count 82 field is used to track whether the node corresponds to a leaf node or an internal node and hence whether to trigger ray-volume or ray-primitive testing. Another field 81 is provided that indicates which rays in the group of rays performing the traversal together should be tested for the node in question.

As mentioned above, the traversal stack is in the present embodiments managed for the group of rays as a whole, via a set of shared registers allocated for the execution threads processing the rays. This can therefore help reduce memory bandwidth since the traversal stack can be managed for the group as a whole locally to the graphics processor.

Figure 9:
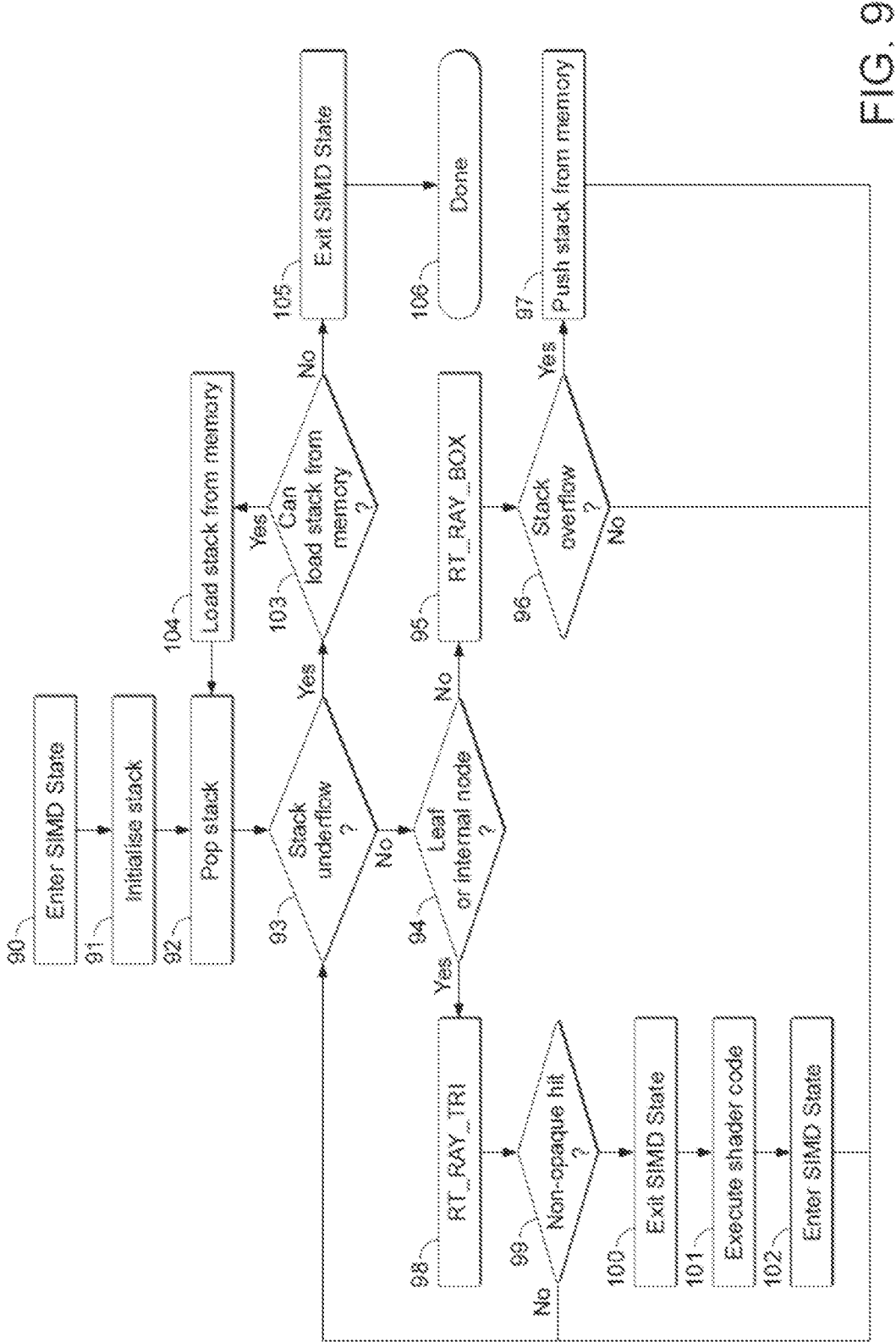
FIG. 9 is a flowchart showing the operation of a graphics processor in an embodiment of the technology described herein.

FIG. 9 is a flowchart showing the operation of a shader core 61 of the graphics processor 60 when performing a ray tracing-based rendering process to render a view of the scene in an embodiment of the technology described herein.

FIG. 9 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the thread creator 72 generating an appropriate execution thread corresponding to the sampling position that is being rendered. The execution thread will then execute an initial ray tracing shader program to perform the ray tracing-based rendering process for the sampling position.

In the present embodiments, the initial ray tracing shader program that is executed for a sampling position will, inter alia, include one or more instructions that when executed trigger the programmable execution unit 65 to send a message 75 to the intersection testing circuit 74 to perform the required ray-volume or ray-primitive intersection testing between the ray in question and a given node of the BVH tree to be tested against.

In the present embodiments, the shader program is executed by a group of plural execution threads (e.g. a warp), with each execution thread performing the traversal operation for a respective ray in a group of plural rays that are thereby caused to perform the traversal operation together, as a whole. To facilitate this, the shader program to perform the traversal operation may include an initial instruction that ensures (forces) all of the execution threads in the group of execution threads to be in an 'active' state, e.g. such that the traversal operation can then be performed using the execution thread group as a whole, e.g. in SIMD execution state.

Thus, as shown in FIG. 9, when, during execution of the initial ray tracing shader program for a sampling position, the programmable execution unit 65 encounters and executes such an 'Enter_SIMD_state" instruction (step 90), at this point it can be ensured that all of the execution threads in the group of execution threads executing the program are in an active (SIMD) state.

The traversal stack that is maintained for the group of execution threads can then be suitably initialised for the traversal operation (step 91).

The first entry in the traversal stack (e.g. the root node) is then popped from the stack in order to start the traversal operation (step 92).

At this point the root node will be the only entry in the traversal stack, such that there will be no stack underflow (step 93—No) and the shader program then proceeds to determine whether the node is leaf node or an internal node (step 94).

For the root node, and other internal nodes encountered during the traversal operation, it is then necessary to perform the required ray-volume intersection testing to determine whether the node represents any geometry that may be intersected by a ray in the group of rays that are performing the traversal operation together. This is done by including into the shader program an appropriate ray-volume testing instruction ('RT_RAY_BOX') that when executed (step 95) by the execution unit will trigger the execution unit to message the ray-volume intersection testing circuit 77 of the intersection testing circuit 74 to perform the desired ray-volume testing.

Figure 10:
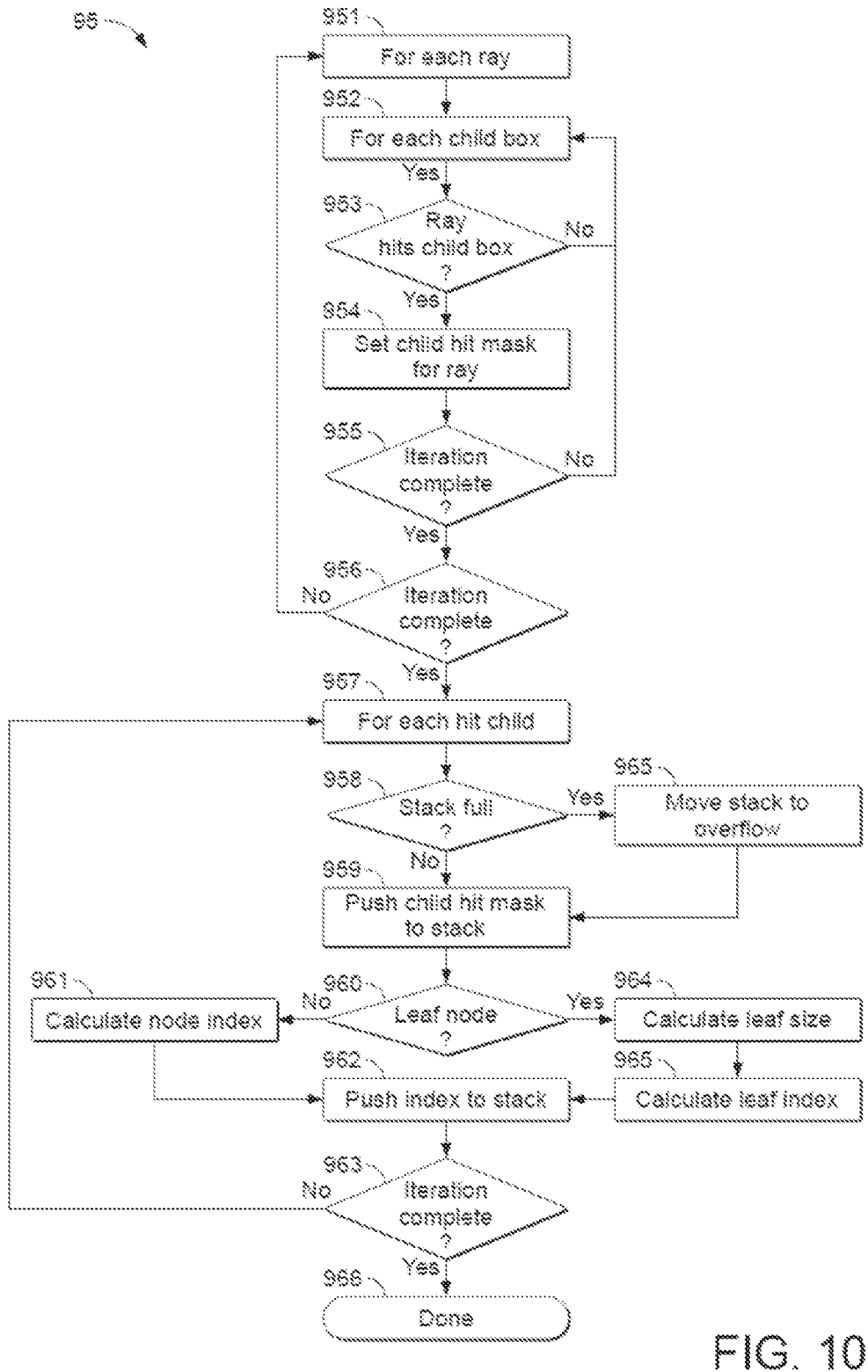
FIG. 10 is a flowchart showing a ray-volume intersection testing operation according to an embodiment of the technology described herein.

FIG. 10 is a flowchart showing a ray-volume intersection testing operation according to an embodiment of the technology described herein.

As shown in FIG. 10, when the ray-volume testing instruction ('RT_RAY_BOX') is executed in respect of a given node in the BVH tree, a first ray in the group of plural rays performing the traversal operation that need to be tested for intersection with the node (as indicated in the appropriate field 81 in the traversal stack) is selected (step 951), and this is then iteratively tested against each child node volume associated with the node in question (step 952). The child node volumes can be obtained in any suitable and desired manner. In embodiments, the child node volumes associated with a particular node are stored in an encoded manner, as will be described further below.

Thus, for each child node volume, it is determined whether the ray intersects with the child volume (step 953), and if the ray does intersect, a hit mask for the child node (field 81 in FIG. 8) is set accordingly to reflect this. If the ray does not intersect the first child node volume, the ray is then tested against the next child node volume, and so on, until the iteration for that ray over the child node volumes is finished (step 955). The testing then iterates over the rays that are to be tested against the node until all of the rays have been tested against all of the child node volumes (step 956).

For each child node volume that was intersected, a result of the intersection testing is then returned, with an appropriate entry being pushed to the traversal stack such that the child node can then be tested accordingly (step 957).

As part of this, it is first tested whether the pushing of the results of the intersection testing would cause the traversal stack to overflow, i.e. because the stack is full (step 958). So long as there are available entries in the traversal stack (step 958—No) a suitable entry is then pushed to the traversal stack, with the entry including the hit mask (field 81 in FIG. 8) for the child node, as well as the leaf count and indication of the child node (fields 82 and 83 in FIG. 8).

For instance, it is then determined whether the child node is a leaf node (step 960). If the node is not a leaf node, a node index can then be calculated indicating which child nodes are associated with the node (step 961) and pushed to the traversal stack accordingly. On the other hand, if the child is a leaf node, the leaf size is then calculated (step 964), and an appropriate leaf index calculated indicating which primitives are represented by the leaf node (step 955) which is then pushed to the traversal stack.

This is done for each child node that was determined as being intersected by a ray (step 963) until respective entries for each child node have been appropriately added into the traversal stack.

The result of the intersection testing is then returned accordingly, and pushed to the traversal stack for the traversal operation. In the event that the result of the intersection testing overflows the traversal stack (step 96—Yes), the entire traversal stack is then pushed to memory (step 97), and an indication of this is recorded into the traversal stack. This can then be checked (at step 93) and in the event that there has been an overflow event (step 93—Yes), it is then checked whether the stack can be loaded from memory (step 103), and if so the stack is then loaded in appropriately (step 104), and the stack entries popped (step 92) so that the traversal operation can continue.

On the other hand, if the stack cannot be loaded from memory, for any reason, in that case the traversal operation may be done (step 106), with the execution thread group first exiting the SIMD state (step 105) accordingly.

The traversal stack can thus be worked through in order to test the various nodes of the BVH tree to determine which nodes represent geometry that may be intersected by the rays in the group of rays performing the traversal operation together.

When the traversal operation reaches a leaf node at the end of given branch of the BVH tree, such that it is determined that the node is leaf node (at step 94), with the traversal operation therefore indicating that the leaf node represents geometry that may be intersected by a ray, the actual geometry intersections are then determined.

This can be done in various ways but in the present embodiments this is done by including into the shader program an appropriate instruction ('RT_RAY_TRI') that when executed (step 98) by the execution unit will trigger the execution unit to message the ray-primitive intersection testing circuit 75 of the intersection testing circuit 74 to perform the desired ray-primitive testing.

Figure 11:
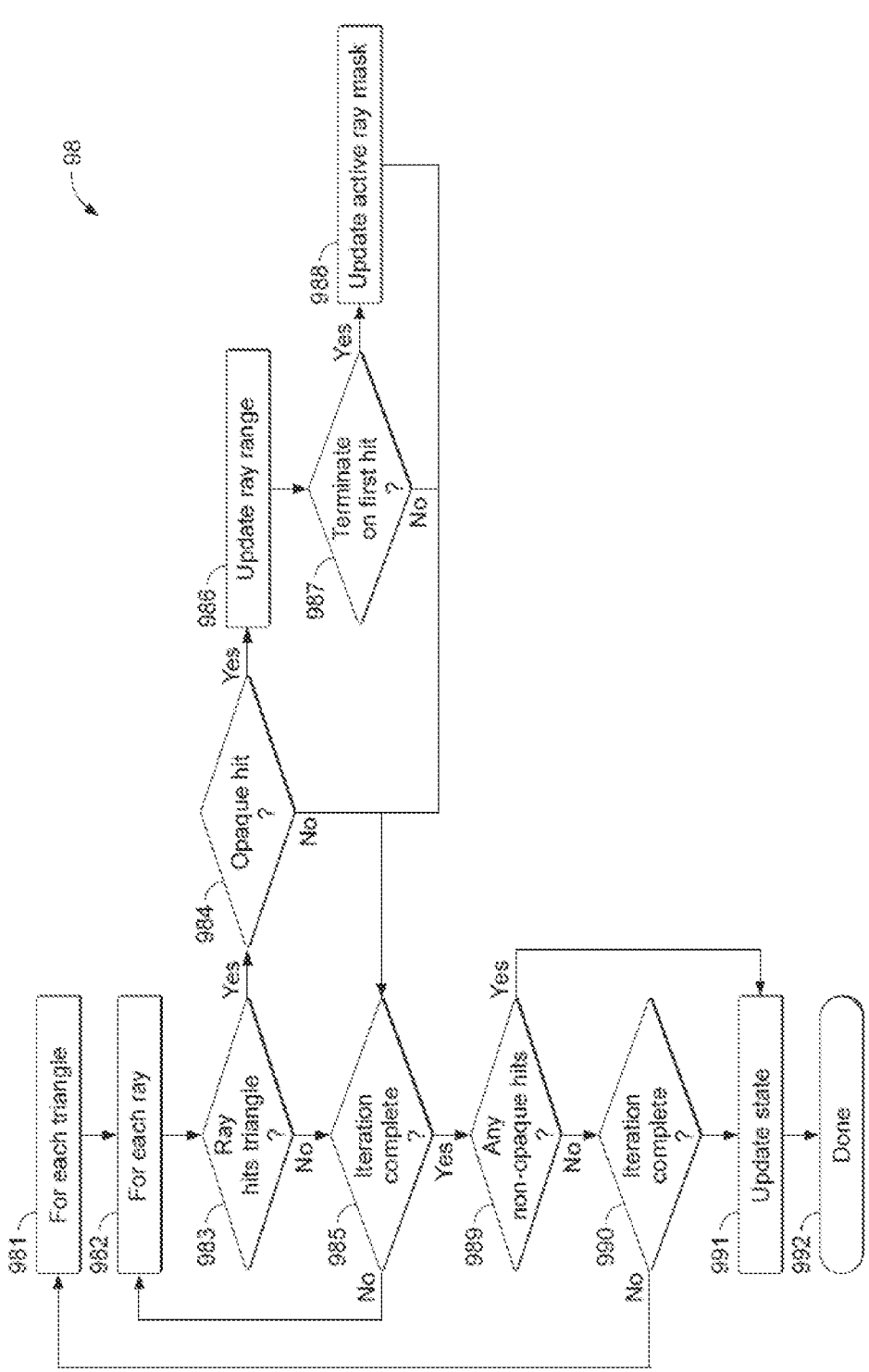
FIG. 11 is a flowchart showing a ray-primitive intersection testing operation according to an embodiment of the technology described herein.

FIG. 11 is a flowchart showing a ray-primitive intersection testing operation according to an embodiment of the technology described herein.

As shown in FIG. 11, in response to executing the ray-primitive intersection testing ('RT_RAY_TRI') instruction in respect of a leaf node, the set of primitives (e.g. triangles) represented by the leaf node are then loaded for testing.

For each primitive (triangle) represented by the leaf node (step 981), the rays that were determined to intersect the leaf node volume (as indicated by the hit mask, field 81 in FIG. 8) are then iteratively tested against the primitive (step 982) to determine whether or not the ray hits the primitive (step 983). If there are no hits, the next ray is then tested (step 985), and so on, until all of the rays have been tested against the primitive.

For any hits, it is then determined whether there is an 'opaque' hit (step 984). If the ray hits opaque geometry, the ray does not need to propagated further, and so the range can then be updated accordingly (step 986). It can then be determined whether the ray is flagged to terminate on the first hit (step 987). If yes, the hit mask (field 81 in FIG. 8) can be updated appropriately (step 988) and the testing can then move on the next ray.

Once all of the rays have been tested against the (first) primitive, it is then determined whether there were any non-opaque hits (step 989). For any rays that are determined to hit a 'non-opaque' primitive, the ray-primitive testing may need to terminate early, e.g., with the result being returned to the shader program accordingly, such that the shader program can determine how to handle the non-opaque hit (i.e. whether or not the hit needs to be counted). Thus, in the event that there are any non-opaque hits, the ray-primitive testing may be terminated early (without testing any more primitives), with the traversal state being updated accordingly (step 991). In that case, the ray-primitive intersection testing is terminated for all of the rays, such that the group of rays remains together for the traversal operation.

Otherwise, if there are no non-opaque hits, the ray-primitive intersection testing moves on to testing the next primitive (step 990), and iteratively tests the rays in the group of rays for intersection with that primitive, and so on, until all of the primitive for the leaf node have been tested. Once the ray-primitive intersection testing has finished, the traversal state can thus be updated accordingly with the result of the intersection testing (step 991), and the operation is then done (step 992).

The traversal operation thus uses the information provided about the rays to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (potential) intersection with geometry defined for the scene is found for the ray.

Other arrangements would, of course, be possible.

The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the ray tracing acceleration data structure traversal operation 74 has performed the necessary traversal or traversals for a ray, and determined geometry that is intersected by the ray, that information is returned to the programmable execution unit 65, for the programmable execution unit to perform further processing for the sampling position in question as a result of, and based on, the result of the determined traversal for the ray.

For instance, in the present embodiments, the programmable execution unit 65 may then execute further "surface processing" shader programs that will perform further processing for the sampling position in question based on the result of the ray tracing acceleration data structure traversal for the ray.

In the present embodiments, there are plural different sets of further "surface processing" shader programs that can be executed, in dependence upon the type of geometry that has been determined by the ray tracing acceleration data structure traversal circuit as being intersected by a ray (and in particular in dependence upon the particular surface type (surface property or properties) of the geometry determined by the ray tracing acceleration data structure traversal circuit).

Thus the process operates to select the further "processing" shader program to be executed to perform further processing for the sampling position corresponding to a ray in accordance with the type of geometry (and in particular the surface type), that has been determined by the ray tracing acceleration data structure traversal circuit as being intersected by the ray.

In order to perform and control this operation, in the present embodiments, the ray tracing acceleration data structure traversal circuit triggers the generation of an execution thread that is to execute (and that executes) the selected further "surface processing" shader program for the geometry type in question.

The programmable execution unit 65 then executes the selected further shader program for the generated thread (e.g. step 45 in FIG. 4).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, appropriate 'ray-volume' and 'ray-primitive' intersection testing instructions to cause the programmable execution unit to send a message to the intersection testing circuit 74 to perform the desired intersection testing.

The compilation process (the compiler) can use any suitable and desired compiler techniques for this.

Figure 12:
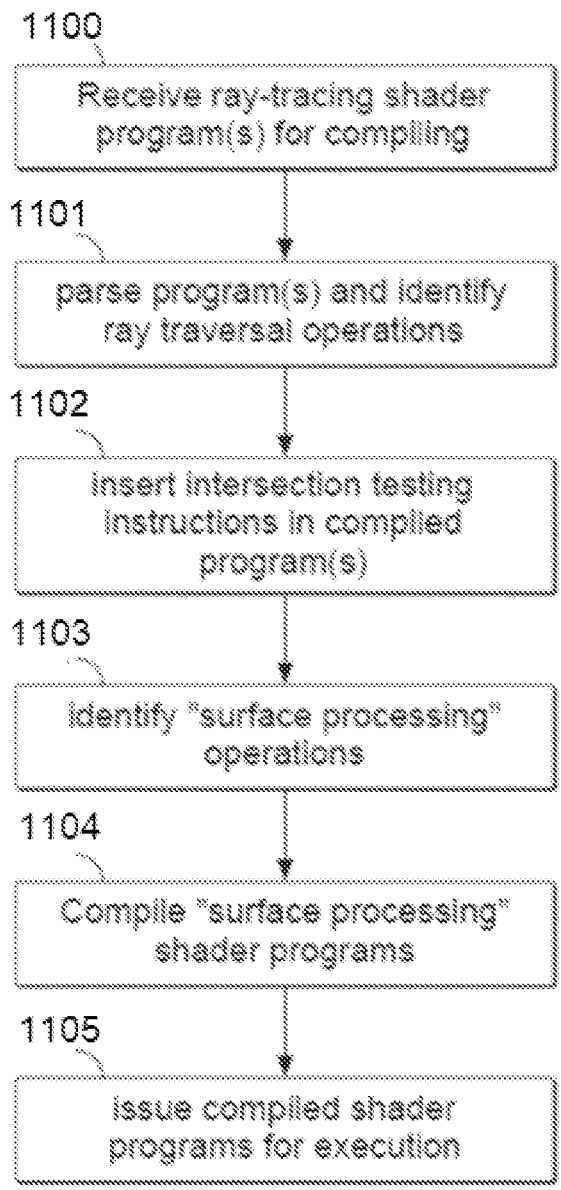
FIG. 12 shows an embodiment of a shader program compilation process.

FIG. 12 shows an embodiment of the compilation process.

As shown in FIG. 12, the compiler for the graphics processor will receive a ray tracing-based rendering program or programs for compiling (step 1100).

The compiler will then analyse the shader program code that is provided, to identify instances of required intersection testing during the ray traversal operations in that shader program code (step 1101), and to insert corresponding instruction(s) at the appropriate point(s) in the compiled shader program(s) (step 1102).

The required "surface processing" operations for the intersected geometry can also be identified (step 1103) and respective "surface processing" shader programs compiled (step 1104).

The compiled shader programs will then be issued to the graphics processor for execution (e.g. stored in appropriate memory of and/or accessible to the graphics processor, so that the graphics processor can fetch the required shader programs for execution as required) (step 1105).

It can be seen from the above that the technology described herein, in its embodiments at least, can provide a more efficient process for performing ray tracing-based rendering. This is achieved, in the embodiments of the technology described herein at least, by using an intersection testing circuit to perform ray-volume intersection testing for rays being processed, but with other processing for the ray tracing-based rendering being performed by executing an appropriate shader program or programs using a programmable execution unit of the graphics processor.

As mentioned above, in embodiments, the child node volume data is stored in an encoded manner to facilitate more efficient memory access. This in turn can further improve the efficiency of the overall process for performing ray tracing-based rendering.

For example, the main (e.g. off-chip) memory in an embodiment is configured to access data in fixed bursts/blocks of data, for example 64-byte naturally aligned blocks of data, to maximise memory access efficiency. The graphics processor cache memory (where a cache system is used), and cache line size is similarly arranged to fetch blocks of data in this manner. Using the same memory access size throughout the memory system can be more efficient. To maximise memory access efficiency, the plural child node volumes associated with a given parent (non-leaf) node may therefore be stored in a single memory "block", which is aligned to the memory access size.

An axis-aligned bounding volume (AABV) can be defined using (only) two vertices, in particular the bottom-left (x_low, y_low, z_low) and top-right (x_high, y_high, z_high) vertices. If each value is expressed as a 32-bit IEEE floating point number, each vertex (x,y,z) can then be specified using 12 bytes of data and a bounding volume uses 24 bytes of data. Using vertices expressed in this manner a 64 byte cache line would thus only store two child bounding volumes.

In embodiments, therefore, the child node vertices are stored in an encoded manner in which the vertices are stored relative to the parent volume bottom-left vertex and are compressed (quantised) and re-structured to reduce the amount of data that is required to store a bounding volume. For example, in embodiments, an internal (non-leaf) node in the bounding volume hierarchy comprises six child bounding volumes. By storing each of the six child bounding volumes associated with the node in a single memory block, the multiple rays in the group of plural rays that are performing the traversal at the same time can be tested against the six child nodes in one processing instance, thus reducing the number of memory access operations.

To achieve this, in embodiments, the node volume data for a parent (non-leaf) node is stored in memory as follows.

First, one of the parent vertices, for example the minimum (bottom-left) vertex, is stored, e.g. in 24-bit non-IEEE floating point compliant format.

For each child node for which data is to be stored, there is stored a bounding volume and a node type. The node type indicates whether the node is a leaf node, an internal node or if the node is not used.

The bounding volume is stored in an encoded manner. In particular, the child upper (top-right) and lower (bottom-left) vertices are stored relative to the lower (bottom-left) co-ordinate of the parent bounding volume and quantised to 8-bits. When quantising the child volume co-ordinates the data is rounded conservatively so that the child bounding volumes can only become bigger as a result of the quantisation.

The quantised child co-ordinates are then scaled, with a separate scaling factor for each axis. The scaling factor is used for all child vertices.

Two portions of data are therefore stored for use in determining the child volume vertices; a scaling factor (which is common to all of the child nodes) and a set of quantised 'base' co-ordinates (which is unique to a child node).

The size of the quantised step can be determined from the size (in x,y,z) of the parent bounding volume, as follows (in GLSL pseudocode): (parentSize) const float steps_per_play=pow(2.0, 8.0)−1.0; Here, the scaling factor is stored as an 8-bit quantity, so there are 255 steps (i.e. 2^8−1). The scaling factors can then be determined as follows: scale=pow(vec3(2.0), max(vec3(−127.0), ceil(log 2(parentSize/steps_per_play)))); For example, looking at a specific axis, the 8-bit scaling factor for that axis can be determined as: scaling_factor_for_axis=(parentSize_for_the_axis)/255, where the maximum value is −127.

As mentioned above, there are two vertices to define the child bounding box, one for the lower co-ordinate and the other for the upper co-ordinate. The base co-ordinate values (i.e. the stored/compressed co-ordinates) for each child node, for each axis, can thus be calculated as follows:

For the child lower co-ordinate:

floor((childMin_for_axis−parentMin_for_axis)/scaling_factor_for_axis);

For the child upper co-ordinate:

ceil((childMax_for_axis−parentMin_for_axis)/scaling_factor_for_axis);

where 'parentMin_for_axis' is the minimum value along the axis for the parent bounding volume and where 'childMin_for_axis' and 'childMax_for_axis' are the lower and upper co-ordinates of the child bounding volume along the axis. Note that conservative rounding is performed using the floor/ceiling functions to ensure the quantisation can only result in the bounding volumes becoming larger. This encoding is performed for the co-ordinate values for each child node for each of the axes in order to determine the suitable set of base co-ordinate values that are to be stored for the child node. When the child node volume is required, the data must therefore be suitably be decoded, by reversing the encoding described above, i.e. by re-scaling the base values using the appropriate scaling factors to recover the 'true' values, as follows:

modified_co-ordinate_for_axis=base_co-ordinate_for_axis*scaling_factor_for_axis+parentMin_for_axis where 'modified_co-ordinate_for_axis' is the actual co-ordinate that is used when determining the child node volume, and where 'base_co-ordinate_for_axis' is the stored/compressed co-ordinate value. This encoding can facilitate more efficient storing of the child bounding volume data in memory. For instance, an example data structure storing the child bounding volumes for a given internal (non-leaf) node according to an embodiment is illustrated in FIG. 13.

In particular, FIG. 13 shows a 64 byte data structure 1300 which is arranged as 16 lines with each line able to store 32 bits of data, such that the data structure is aligned with the size of the cache lines and memory transactions (i.e. 64 bytes). In FIG. 13, child bounding volume data is stored for six different child nodes. Thus, in this embodiment, as shown in FIG. 13, all of the data for the six child nodes can easily fit within a single 64 byte data structure, such that the six child bounding volumes can all be obtained in a single memory transaction.

As shown in FIG. 13, the data structure 1300 stores (in this example in the first three lines although other arrangements would of course be possible) the respective co-ordinates for the (e.g.) minimum (bottom-left) parent vertex (i.e. the parentMin_for_axis values) as p_x, p_y, p_z. In this example, as shown in FIG. 13, the parent vertex co-ordinates p_x, p_y, p_z are each stored as 24-bit floating point values. Thus, 9 bytes of data are used for storing the parent co-ordinates for the three axes. Other arrangements would of course be possible.

As mentioned above, the child node co-ordinates are encoded relative to the parent vertex co-ordinates, i.e. relative to p_x, p_y, p_z. However, rather than storing the differences in full, the differences are instead encoded using the scaling factors as described above, such that for each child node bounding volume there is stored (for each axis) a base co-ordinate value, to which the per axis modifiers (scaling factors) can be applied to determine the actual co-ordinate value relative to the parent vertex co-ordinates.

The data structure 1300 accordingly also stores respective modifier values in the form of respective scaling factors for each of the x,y,z axes: scale_x, scale_y, scale_z. In this example, each scaling factor is stored as a 32-bit floating point exponent for the axis (therefore as an 8-bit unsigned value), such that 3 bytes are used to store the scaling factors, but other arrangements would of course be possible. These scaling factors are applied to the base co-ordinate values for all of the child nodes.

The data structure 1300 also stores the base co-ordinate values for each of the child nodes, where 'lo_x0, hi_x0' are 8-bit values for the lower and upper co-ordinates of the bounding volume for child node '0' along the x axis, and where 'lo_y0, hi_y0' and 'lo_z0, hi_z0' are the corresponding co-ordinates for child node '0' along the y and z axes, and so on for the other child nodes (which in this example there are six child nodes, numbered respectively '0' through '5'). Thus, for each child node, there are stored six 8-bit base co-ordinate values, totaling 6 bytes per child node. In total therefore, 36 bytes are used for storing the base co-ordinate values for the six child nodes, although other arrangements would of course be possible.

The data structure 1300 may further store any other data that may desirably be stored in respect of the nodes. For instance, as shown in FIG. 13, the data structure 1300 further stores, in respect of each node, a respective node type value nt0, ..., nt5. The node type value indicates a type of child node, e.g. whether the child node is a leaf node containing primitives, whether the child node is another internal (non-leaf) node, or whether the child node is not used. Further, it will be appreciated that other metadata may also be stored as part of the same data structure 1300. For instance, in the data structure 1300 shown in FIG. 13 there are a number of spare bits that can be used for storing any suitable and desired data (or metadata) that may desirably be stored in respect of the node in question.

It will be appreciated that storing the child node volume data in this way can therefore allow for a more efficient packing of the data in memory, e.g. such that in the example shown in FIG. 13 child node volume data for up to six child nodes can be stored within a single 64-byte data structure that can be obtained in a single memory transaction. Storing the child node volume data in this encoded manner can therefore be very efficient. The node data can then be obtained from memory and processed as part of the ray tracing traversal operation, e.g. as described above.

FIG. 14 is a flow chart illustrating how the child node volume data may be obtained according to an embodiment. In particular, at some point during a ray tracing operation, it may be determined that child node volume data is required for an internal (non-leaf) node, e.g. that is to be tested as part of the traversal operation (step 1400). The graphics processor may thus issue a request to the memory system for the required child node volume data (step 1401). If the data is already present locally, e.g. within a cache, it can be fetched from that location accordingly. On the other hand, if the data is not present locally, it must be obtained from memory.

In the present embodiment the data is stored in memory in an encoded form, as described above and as shown in FIG. 13. Thus, the child node volume data is in the present embodiments obtained from memory in such encoded form (step 1402), e.g. by reading in the data structure 1300 shown in FIG. 13. The child node volume data must therefore be decoded, e.g. by applying the scaling factors to the respective base co-ordinate values, as described above, in order to determine the associated child node bounding volume (step 1403). The decoded bounding volume can then be used, e.g., for the ray-volume intersection testing described above, as part of the ray tracing operation.

In embodiments, the primitives represented by a respective leaf node of the BVH are also stored in memory an efficient manner to facilitate improved memory access. For example, a primitive is often expressed as a triangle, and therefore has three vertices, (x0, y0, z0), (x1, y1, z1) and (x2, y2, z2). Therefore, where each axis is expressed as a 32-bit floating point number, each vertex is specified using 12 bytes of data and a primitive specified using 36 bytes of data. To facilitate memory access, in embodiments, a plurality of primitives are thus stored together in a single data structure that fits within an integer number of cache lines. Again, this has the benefit that by storing a plurality of primitives in a BVH leaf node, that multiple rays in the group of plural rays that are performing the traversal at the same time can be tested against multiple ray-primitive intersects in one processing instance, thus reducing the number of memory access operations.

For example, in embodiments, a leaf node may comprise three primitives (triangles). In that case, each triangle comprises three vertices, each vertex comprising three 32-bit floating point numbers. Each triangle also comprises validity and opaqueness fields. These fields indicate whether the corresponding triangle is valid (is used), and if so, whether the triangle is opaque.

FIG. 15 shows an example of a data structure 1500 for storing such data in memory. In particular, FIG. 15 shows a 128 byte data structure comprising 32 lines each capable of storing 32 bits. This data structure can therefore fit within two 64 byte cache lines. As shown in FIG. 15, the primitive vertices in this example are stored as 32-bit floating point co-ordinate values for each axis, where 'tri_0_vertex_0_x' represents the x co-ordinate of the first vertex (vertex 0) for the first primitive (triangle 0), 'tri_0_vertex_0_y' and 'tri_0_vertex_0_z' are the corresponding y and z co-ordinates, and so on.

Thus, as shown in FIG. 15, for each primitive there are stored three vertices, with three co-ordinates (x,y,z) being stored for each vertex. In this example, 36 bytes are thus required for storing each primitive. In FIG. 15, three primitives are thus stored together in the same 128 byte data structure 1500. Other arrangements would of course be possible.

Various other primitive data or metadata may also be stored in the same data structure 1500. For instance, as shown in FIG. 15, there is also stored in the same data structure 1500 respective bits V0, V1, V2 indicating whether the primitives are valid. Also stored are respective bits O0, O1, O2 indicating whether the primitives are opaque. Other arrangements would of course be possible for storing such metadata.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor when rendering a frame that represents a view of a scene comprising one or more objects using a ray tracing process,
wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene,
the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays;

the graphics processor comprising a programmable execution unit operable to execute programs to perform graphics processing operations, and in which a program can be executed by groups of plural execution threads together;

the method comprising:

when a group of execution threads is executing a program to perform a ray tracing acceleration data structure traversal, with individual execution threads in the group of execution threads performing a traversal operation for a respective ray in a corresponding group of rays such that the group of rays performing the traversal operation together, in response to the execution threads executing a set of one or more ray-volume testing instructions that are included in the program in respect of a node of the ray tracing acceleration data structure:

testing one or more rays from the group of plural rays that are performing the traversal operation together for intersection with the one or more volumes associated with the node being tested; and returning a result of the intersection testing for the node for the traversal operation;

wherein the graphics processor further comprises an intersection testing circuit operable to test rays for intersection with the volumes associated with the nodes of the ray tracing acceleration data structure, and wherein the set of one or more ray-volume testing instructions, when executed by execution threads of the group of plural execution threads, will cause the execution unit to message the intersection testing circuit to perform the testing of the one or more rays from the group of plural rays that are performing the traversal of the ray tracing acceleration data structure together for intersection with the one or more volumes associated with the node to be tested and to return the result of the intersection testing for the node being tested to the execution unit.

2. The method of claim 1, wherein the ray tracing acceleration data structure comprises a tree structure comprising a plurality of branches associated with a respective plurality of leaf nodes, wherein each non-leaf in the tree structure is a parent node for a respective set of plural child nodes, each non-leaf node thereby being associated with a corresponding plurality of child volumes, and wherein testing rays for intersection with the volume associated with a node comprises testing the rays for intersection with the volumes for each of the respective set of child nodes for the node being tested, the method comprising returning a result of the intersection testing for each of the child nodes of the node being tested.

3. The method of claim 1, wherein a traversal record is maintained in order to manage the traversal operation, wherein the program is operable to work through the entries in the traversal record to determine which nodes should be tested, and wherein the result of the intersection testing comprises an indication of which node or nodes are to be tested during the traversal operation, the indication being written to the traversal record.

4. The method of claim 3, wherein the traversal record comprises a traversal stack.

5. The method of claim 3, wherein the result of the intersection testing also comprises an indication of which of the one or more rays that were tested against the node were determined to intersect the one or more volumes associated with the node.

6. The method of claim 3, wherein when writing the result of the intersection testing would cause overflow of the traversal record, the whole traversal record is written out to memory, and an indication of this is written into the traversal record to allow the execution unit to subsequently load in the traversal record that was written out.

7. The method of claim 3, wherein the traversal record is managed via a set of shared registers allocated for the group of plural execution threads that are executing the program to perform the traversal operation for the group of plural rays.

8. The method of claim 1, wherein the program also includes a set of one or more instructions that when executed cause the execution threads in the group of execution threads to be in an active state at least until the traversal operation to determine which, if any, geometry for the scene may be intersected by the rays is finished for all of the rays in the group of rays being processed by the group of execution threads, such that the group of rays performs the traversal operation together.

9. A method of compiling a shader program to be executed by a programmable execution unit of a graphics processor that is operable to execute graphics processing programs to perform graphics processing operations;

the method comprising:

including in a shader program to be executed by a programmable execution unit of a graphics processor when rendering a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays, and wherein the program is to be executed by a group of plural execution threads, with individual execution threads in the group of execution threads performing a traversal operation for a respective ray in a corresponding group of rays:

a set of one or more ray-volume testing instructions for testing rays for intersection with the one or more volumes associated with a given node of the ray tracing acceleration data structure that is to be tested during the traversal operation, which set of ray-volume testing instructions, when executed by execution threads of the group of plural execution threads, will cause:

the graphics processor to test one or more rays from the group of plural rays that are performing the traversal operation together for intersection with the one or more volumes associated with the node being tested; and a result of the intersection testing to be returned for the node for the traversal operation;

wherein the set of one or more ray-volume testing instructions, when executed by execution threads of the group of plural execution threads, will cause the execution unit to message an intersection testing circuit of the graphics processor operable to test rays for intersection with the volumes associated with the nodes of the ray tracing acceleration data structure to perform the testing of the one or more rays from the group of plural rays that are performing the traversal of the ray tracing acceleration data structure together for intersection with the one or more volumes associated with the node to be tested and to return the result of the intersection testing for the node being tested to the execution unit.

10. A graphics processor that is operable to render a frame that represents a view of a scene comprising one or more objects using a ray tracing process, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing process comprising performing for a plurality of rays a traversal of the ray tracing acceleration data structure to determine, by testing the rays for intersection with the volumes represented by the nodes of the acceleration data structure, geometry for the scene to be rendered that may be intersected by the rays;

the graphics processor comprising:

a programmable execution unit operable to execute programs to perform graphics processing operations, and in which a program can be executed by groups of plural execution threads together;

wherein the execution unit is configured such that, when a group of execution threads is executing a program to perform a ray tracing acceleration data structure traversal, with individual execution threads in the group of execution threads performing a traversal operation for a respective ray in a corresponding group of rays that are thereby performing the traversal operation together, in response to the execution threads executing a set of one or more ray-volume testing instructions included in the program in respect of a node of the ray tracing acceleration data structure:

the execution unit triggers testing of one or more rays from the group of plural rays that are performing the traversal of the ray tracing acceleration data structure together for intersection with the one or more volumes associated with the node being tested, wherein a result of the intersection testing is then returned for the node for the traversal operation;

wherein the graphics processor further comprises an intersection testing circuit operable to test rays for intersection with the volumes associated with the nodes of the ray tracing acceleration data structure, and wherein the set of one or more ray-volume testing instructions, when executed by execution threads of the group of plural execution threads, will cause the execution unit to message the intersection testing circuit to perform the testing of the one or more rays from the group of plural rays that are performing the traversal of the ray tracing acceleration data structure together for intersection with the one or more volumes associated with the node to be tested and to return the result of the intersection testing for the node being tested to the execution unit.

11. The graphics processor of claim 10, wherein the ray tracing acceleration data structure comprises a tree structure comprising a plurality of branches associated with a respective plurality of leaf nodes, wherein each non-leaf in the tree structure is a parent node for a respective set of plural child nodes, each non-leaf node thereby being associated with a corresponding plurality of child volumes, and wherein testing rays for intersection with the volume associated with a node comprises testing the rays for intersection with the volumes for each of the respective set of child nodes for the node being tested.

12. The graphics processor of claim 10, wherein a traversal record is maintained in order to manage the traversal operation, wherein the program is operable to work through the entries in the traversal record to determine which nodes should be tested, and wherein the result of the intersection testing comprises an indication of which node or nodes are to be tested during the traversal operation, the indication being added to the traversal record.

13. The graphics processor of claim 12, wherein the traversal record comprises a traversal stack.

14. The graphics processor of claim 12, wherein the result of the intersection testing also comprises an indication of which of the one or more rays that were tested against the node were determined to intersect the one or more volumes associated with the node.

15. The graphics processor of claim 12, wherein when added the result of the intersection testing would cause overflow of the traversal record, the whole traversal record is written out to memory, and an indication of this is written into the traversal record to allow the execution unit to subsequently load in the traversal record that was written out.

16. The graphics processor of claim 12, wherein the traversal record is managed via a set of shared registers allocated for the group of plural execution threads that are executing the program to perform the traversal operation for the group of plural rays.

* * * * *